US007263329B2

(12) United States Patent
Acker

(10) Patent No.: US 7,263,329 B2
(45) Date of Patent: Aug. 28, 2007

(54) METHOD AND APPARATUS FOR NAVIGATING, PREVIEWING AND SELECTING BROADBAND CHANNELS VIA A RECEIVING USER INTERFACE

(75) Inventor: Robert Acker, Arlington, VA (US)

(73) Assignee: XM Satellite Radio Inc., Washington, DC (US)

(*) Notice: Subject to any disclaimer, the term of this patent is extended or adjusted under 35 U.S.C. 154(b) by 62 days.

(21) Appl. No.: 10/247,743

(22) Filed: Sep. 20, 2002

(65) Prior Publication Data

US 2004/0058641 A1 Mar. 25, 2004

(51) Int. Cl.
*H04H 1/00* (2006.01)
*H04B 1/38* (2006.01)

(52) U.S. Cl. ............... 455/3.02; 455/158.5; 455/414.4; 455/566

(58) Field of Classification Search ............ 455/158.4, 455/277.1, 66, 345, 12.1, 74, 39–41, 11.1, 455/344, 154.1, 158.1, 3.04, 3.02, 158.2, 455/67.1, 3.03, 3.06, 414.1, 414.4, 66.1, 455/67.7, 550.1, 556.1, 557, 566, 575.1, 455/90.3, 130, 158.5; 725/48, 49, 61, 37, 725/39; 325/260, 343
See application file for complete search history.

(56) References Cited

U.S. PATENT DOCUMENTS 4,887,308 A * 12/1989 Dutton .................... 455/156.1
5,497,371 A * 3/1996 Ellis et al. .................. 370/412
5,497,372 A * 3/1996 Nankoh et al. ............. 370/480
5,689,822 A * 11/1997 Zucker ........................ 455/337
6,104,334 A * 8/2000 Allport ....................... 341/175
6,112,064 A * 8/2000 Arrowsmith et al. ..... 455/186.1
6,208,839 B1 * 3/2001 Davani ....................... 340/7.2
6,272,328 B1 8/2001 Nguyen et al. .......... 455/277.1
6,374,177 B1 4/2002 Lee et al. ................... 701/200
6,381,314 B1 * 4/2002 Walinski ................ 379/101.01
6,493,546 B2 12/2002 Patsiokas ................. 455/277.1
6,553,077 B2 4/2003 Rindsberg et al. .......... 375/260
6,564,003 B2 5/2003 Marko et al. ................. 386/69
6,658,062 B1 12/2003 Nakatsuyama .............. 375/259
6,714,253 B2 * 3/2004 Kim et al. .................. 348/556
6,725,022 B1 * 4/2004 Clayton et al. .......... 455/154.1
6,807,676 B1 * 10/2004 Robbins et al. ............... 725/39
2004/0040038 A1 * 2/2004 Sasaki et al. ................. 725/44

OTHER PUBLICATIONS

Sony Digital Audio Receiver; Operating Instructions, DRN-XM01 (2001).

* cited by examiner

*Primary Examiner*—Pablo N. Tran
(74) *Attorney, Agent, or Firm*—Roylance, Abrams, Berdo & Goodman, L.L.P.

(57) ABSTRACT

A radio receiver and method of controlling the same are provided for use in a digital digital audio radio services system. An improved user interface takes advantage of ancillary data transmitted with a digital broadcast signal to contemporaneously display song titles, artist names, channels categories, and other information on said radio receiver, and to allow a user to select channels based on the ancillary data.

7 Claims, 25 Drawing Sheets

115

| CHANNEL NO. | CHANNEL NAME | ARTIST NAME | SONG NAME |
|---|---|---|---|
| ... | ... | ... | ... |
| 42 | XMLM xL | MARILYN MANSON | LUNCHBOX |
| 43 | XMU | RUSTIC OVERTONES | GAS ON SKIN (XM) |
| 44 | FRED | RED HOT CHILI PE | SOUL TO SQUEEZE |
| 45 | XM CAFE' | KEVIN WELCH + TH | LONG COLD TRAIN |
| 46 | TOP TRACKS | QUEENSRYCHE | JET CITY WOMAN |
| ... | ... | ... | ... |

118 120 122

FIG. 7

METHOD AND APPARATUS FOR NAVIGATING, PREVIEWING AND SELECTING BROADBAND CHANNELS VIA A RECEIVING USER INTERFACE

FIELD OF THE INVENTION

The present invention relates to user interfaces for radio receivers. In particular, the present invention relates to a user interface that is adapted for displaying contemporaneous data from a plurality of digital broadcast information channels, and for selecting one of the plurality of channels for playback and/or presentation.

BACKGROUND OF THE INVENTION

New satellite digital audio radio service (SDARS) systems provide exciting new means of communicating music and information to users. A SDARS system can transmit on the order of 100 or more digital audio radio channels, as well as ancillary data both related and unrelated to the audio programs. Thus, users are able to select from among over 100 channels from anywhere within the service area of the SDARS system, which can span areas the size of continents due t the size of one or more satellite spot beams.

However, with such exciting capabilities comes increased need for a user interface to make selecting program channels more user friendly. With over 100 channels available to choose from, a user may become overwhelmed with the number of choices with regard to channels and genre of channel content. Specifically, with a SDARS system comes a need for an advanced user interface to assist users in selecting channels. Such an advanced user interface will allow the user to select channels based on the category of information or music being transmitted, and to see what is playing on each channel in real-time so that the user is able to determine if a channel change is appropriate without the need to "surf" through the 100 plus channels one at a time, sampling each channel for a few seconds.

Also, in a SDARS system, channels may be added, dropped, or reassigned to new channel numbers by the programming center. With the increased number of channels available to a user, the difficulty for the user in remaining aware of all channel assignments is likewise increased. Therefore, it would be advantageous to provide a user interface which automatically handles channel reassignments, and the like, in such a manner that the user does not need to be aware that a reassignment occurred.

SUMMARY OF THE INVENTION

The above described disadvantages are overcome and other advantages are realized in a system and method according to the present invention. A radio receiver and method of controlling the same are provided. The radio receiver is adapted to receive a satellite broadcast signal comprising a plurality of audio content channels, and ancillary data comprising contemporaneous information related to the plurality of audio content channels, as well as data that is not related to the audio content. The ancillary data comprises artist names, song titles, channel names, channel categories, among other information. The radio receiver generates user interface displays based on the ancillary data, and thereby facilitates user selection of a channel.

In accordance with an embodiment of the present invention, displays are advantageously variable in size to allow the radio receiver to function in both home and car environments. Thus, the radio receiver displays information in small font for proximal use, and in large font (optionally scrolling) for remote use.

In accordance with another embodiment of the invention, the radio receiver is adapted to be connected to a plurality of different types of docking stations, and the receiver stores a plurality of sets of settings for automatic retrieval and use depending on the type of docking station to which the radio receiver is connected. For example, when the radio receiver is connected to a boombox docking station, the line out level is automatically set to a predetermined level, bass and treble level control capability appears, and function keys on a remote control function as volume keys. However, when the radio receiver is connected to a home audio kit docking station, the line out level is variable, bass and treble are automatically set to a predetermined level, and the same function keys on the remote control function as channel change keys.

In another embodiment of the invention, the display is advantageously controllable to display lists of artist names of songs currently playing on the plurality of audio channels, or lists of song names, category names, channel names, or other information.

In another embodiment of the present invention, various channel selection modes are provided, including direct entry mode, in which a user presses numeric keys corresponding to the digits of the desired channel number, and preset mode, in which the numeric keys are each assigned a programmed present channel.

BRIEF DESCRIPTION OF THE DRAWINGS

The various aspects, advantages and novel features of the present invention will be more readily comprehended from the following detailed description when read in conjunction with the appended drawings, in which:

FIG. 7 depicts the memory of FIG. 6 according to an embodiment of the invention;

Throughout the drawing figures, like reference numerals will be understood to refer to like parts and components.

DETAILED DESCRIPTION OF THE PREFERRED EMBODIMENTS

Figure 1:
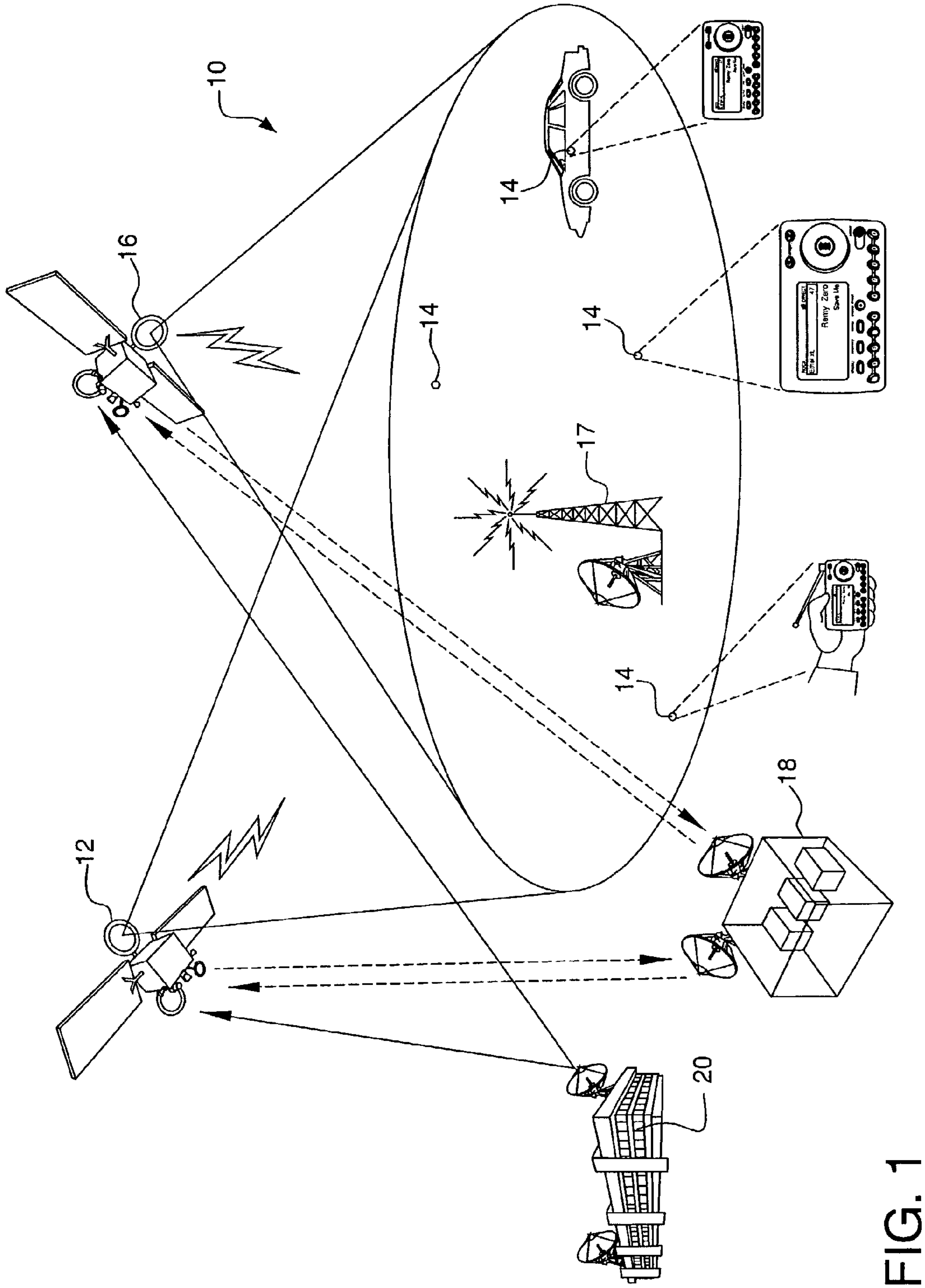
FIG. 1 illustrates a satellite broadcast system according to an embodiment of the present invention.

The preferred embodiments of the invention will now be described with reference to the attached drawing figures. FIG. 1 depicts a satellite broadcast system 10 which comprises at least one geostationary satellite 12, for example, for line of sight (LOS) satellite signal reception at receiver units indicated generally at 14. The satellite broadcast system 10 can be used for satellite digital audio radio service (SDARS), for example. Another geostationary satellite 16 at a different orbital position is preferably provided for diversity purposes. One or more terrestrial repeaters 17 can be provided to repeat satellite signals from one of the satellites in geographic areas where LOS reception is obscured by tall buildings, hills and other obstructions. It is to be understood that different numbers of satellites can be used, and satellites in other types of orbits (e.g., elliptical orbits) can be used. Alternatively, broadcast signals can be sent using only a terrestrial transmission system and no satellites.

As illustrated in FIG. 1, a receiver unit 14 can be configured for stationary use (e.g., on a subscriber's premises), or mobile use (e.g., portable use or mobile use in a vehicle), or both. A control center 18 is provided for telemetry, tracking and control of the satellites 12 and 16. A programming center 20 is provided to generate and transmit a composite data stream via the satellites 12 and 16 which comprises a plurality of broadcast channels.

Figure 2:
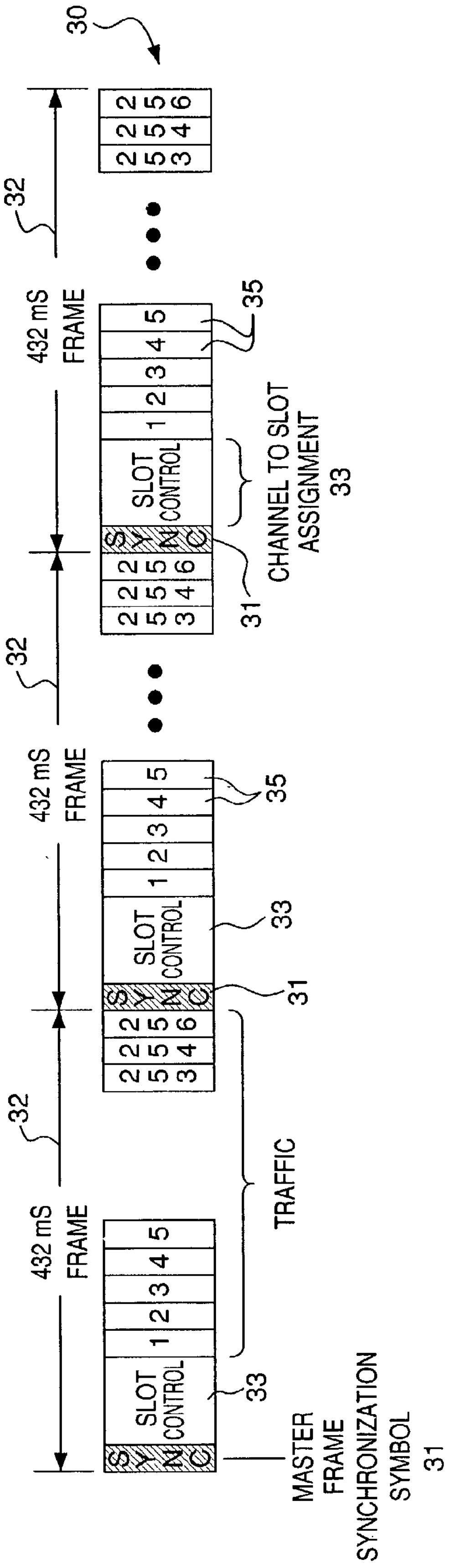
FIG. 2 illustrates a composite data stream used in a satellite broadcast system such as the system depicted in FIG. 1.

An exemplary composite data stream 30 is illustrated in FIG. 2. The system 10 can broadcast a composite data stream 30 generated, for example, by time division multiplexing a plurality of broadcast channels, along with other data such as overhead data. In the illustrated example, the composite data stream 30 comprises frames 32. Each of the frames 32 is provided with a master frame synchronization symbol 31, a slot control field 33 and a plurality of time slots 35 for transporting traffic channels (e.g., 256 time slots per frame). The slot control field 33 comprises overhead data such as channel-to-slot assignment data. The receivers 14 are therefore configured to demultiplex a received composite data stream using the synchronization symbols and the slot control field data to playback a selected one of the broadcast channels.

The programming center 20 is configured to obtain content from different sources and providers which can comprise both analog and digital information such as audio, video, data, program label information, auxiliary information, and so on. For example, the programming center 20 can provide SDARS having on the order of 100 different program channels to transmit different types of music programs (e.g., jazz, classical, rock, religious, country, and so on) and news programs (e.g., regional, national, political, financial and sports). The SDARS can also provide emergency information, travel advisory information, educational programs, and the like.

The types of content to be provided in a broadcast channel is determined manually or automatically via a computer, based on contractual and financial arrangements with information providers, and demographic and financial decisions determining the types of programming to be provided via the programming center 20. In addition, a broadcast channel 30 can comprise plural service components to provide a plurality of different services. For example, a number of service components in a broadcast channel can be related to the same service and can include an audio component and a video and/or a digital data stream comprising auxiliary information, or another audio component to insert advertising information relating to the audio or video program.

The programming center 20 is also configured to broadcast program content and ancillary information that can be related or unrelated to the broadcast program to one or more receivers 14. It can be useful to transmit data to the receivers 14 that is not necessarily one of the broadcast programs such as a music program or news program. For example, it may be desirable to send a mobile receiver updated maps or local weather or traffic reports, which the user can review on-demand. As an alternative example, the programming center 20 can transmit data such as moderator or announcer name and program or show name in connection with the broadcast of a talk show.

Figure 3:
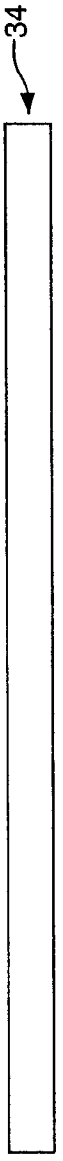
FIG. 3 illustrates a data file utilized in a method and apparatus in accordance with an embodiment of the invention.
Figure 4:
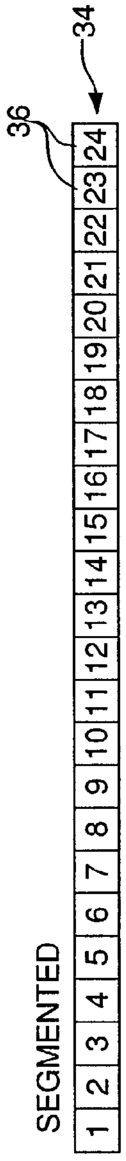
FIG. 4 illustrates a segmented data utilized in a method and apparatus in accordance with an embodiment of the invention.
Figure 5:
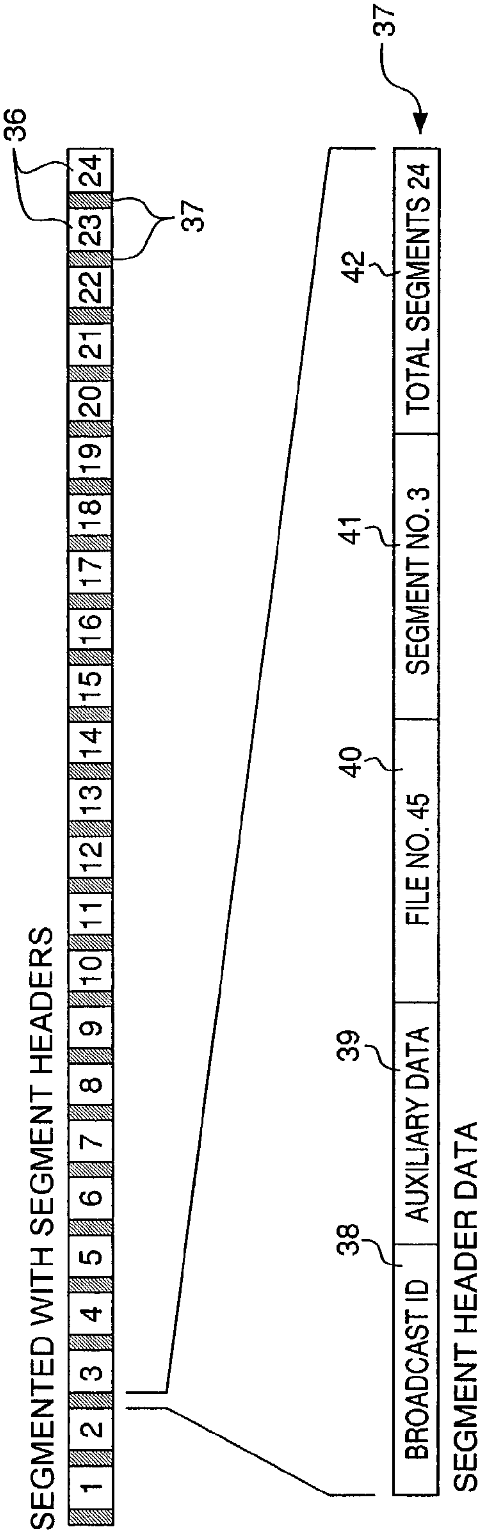
FIG. 5 illustrates segmented data and the content of data headers utilized in a method and apparatus in accordance with an embodiment of the invention.

In accordance with an embodiment of the present invention, the program content and ancillary data (hereinafter referred to as a file 34) to be transmitted via the digital broadcast system such as the system 10 is partitioned at the program center 20, broadcast station 18 or other device in the transmit segment of the system for transmission as segments 36, as shown in FIGS. 3 and 4. The partitioning of the file 34 allows for smaller portions of the file (e.g., 8 kbps channels) to be interspersed with other broadcast content, thereby reducing the demand on the instantaneous bandwidth of the system. As shown in FIG. 5, the segments 36 are provided with headers 37 to facilitate their capture in a local storage device at the receiver 14. The baseband data stream illustrated in FIG. 5 can then be modulated and multiplexed as needed for transmission via the composite data stream illustrated in FIG. 2, for example.

With continued reference to FIG. 5, the segments 36 in a segmented file 34 (e.g., file 45 in FIG. 3) are each provided with a segment header 37 comprising a broadcast identifier (ID) field 38, an auxiliary data field 39, a file number field 40, a segment number field 41 and a total segments field 42. Each file 34 to be transmitted by the digital broadcast system is preferably uniquely numbered, and this number is provided in the file number field of each segment header. The segments 36 associated with a particular file 34 are preferably consecutively numbered. Thus, the total segments field 42 in a segment header 37 indicates the number of segments 36 in the message generated to transmit the file, and the segment number field 41 indicates to a receiver 14 which of the segments in the message is being received. The auxiliary data field 39 can include data such as the destination for the transferred file, that is, which of a number of telematic-enabled devices in the vehicle will be using the file. For example, the file can be used by a GPS receiver in the vehicle or can be intended for the patch RAM in the vehicle engine. The auxiliary data field 39 can also include an expiration date for the transferred file. The broadcast ID 38 indicates which receivers are to receive and capture the file. As discussed below, messages can be sent to individual receivers, to groups of selected receivers, or to all receivers 14.

According to the present invention, file 34 contains digital audio information, such as a song being broadcast, and the auxiliary data field 39 contains data related to the song, such as the channel name, artist name, song name, and the like. File 34 may also contain other audio information, such a talk radio, and auxiliary data field 39 can contain data related to the broadcast, such as the moderator or announcer name and the program or show name.

Figure 6:
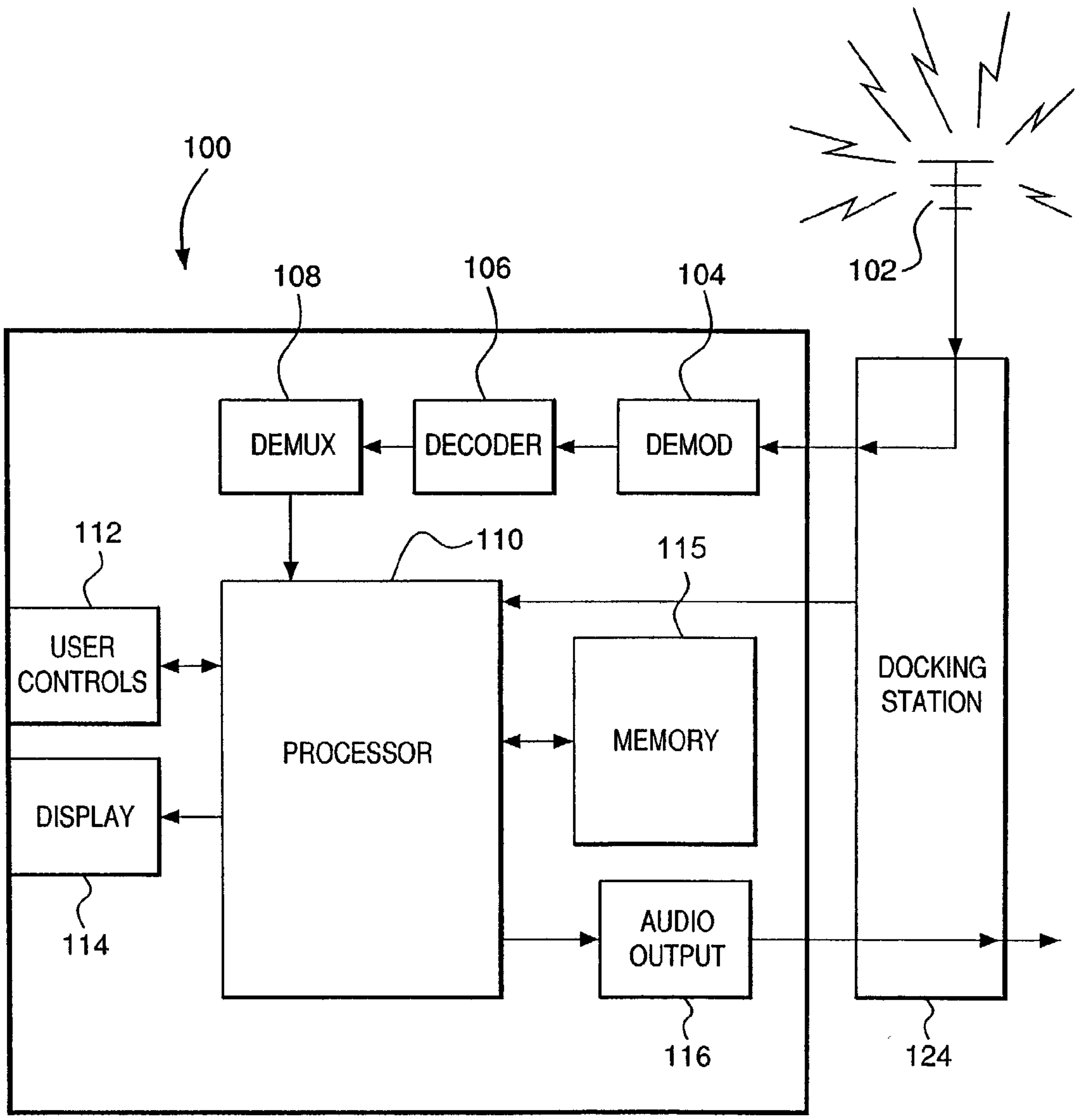
FIG. 6 is a block diagram of a receiver according to an embodiment of the present invention.

FIG. 6 is a block diagram of a receiver 100 according to an embodiment of the present invention. A satellite signal, preferably a SDARS signal, is received at antenna 102 and demodulated at demodulator 104. The demodulator demodulates the incoming signal to baseband. Decoder 106 receives the baseband signal and decodes it into a multiplexed bit stream. Demultiplexer 108 receives the multiplexed bit stream and demultiplexes it into separate channels of information, which are then processed by processor 110. Processor 110 receives inputs from user controls 112 and generates a display 114. The processor also generates audio output 116 based on the particular channel selected by the user. User controls 112 can include button and dial controls on the receiver itself, or a wireless remote control, as will be described in further detail below.

In a SDARS system according to the present invention, the control center 18 embeds real-time ancillary data, including channel name, artist name, and song name for each of the digital audio radio channels into the transmitted broadcast signal. The ancillary data is decoded and stored by processor 110 in memory 115, and updated as it is received. In this manner, processor 110 controls the display 114 to present channel number, channel name, artist name and song name data in real-time. Processor 110 is also able to control display 114 to generate lists of artist names and song names for a plurality of channels contemporaneously. Thus, the receiver 100 of the present invention advantageously presents a real-time selection list including information related to the audio content presently playing on each channel. The user is able to review the information and select a channel to tune-in based on the information, as will be described in greater detail below.

In accordance with an embodiment of the present invention, the radio receiver is configured to accept programming changes instituted by the programming center in a seamless manner. As stated previously, the programming center determines the number of channels and types of programming offered on each channel as a part of the service the satellite broadcast system provides to users with radio receivers. For example, the programming center provides a selected number of news channels for broadcasting, respectively, world news, financial news and national news, a selected number of music channels for broadcasting, respectively, various categories of music (e.g., jazz, classical, rock, country, music from the 1940's, the 1950's, and so on), and a selected number of variety channels for broadcasting, respectively, talk shows, comedy programs, and children's programs, among other types of channels. The programming center, in turn, selects content from different sources to provide on each of these channels.

Users are provided with programming menus and schedules to inform them of the type of content that can be found on the various channels in the received broadcast signal. For example, the broadcast signal comprises ancillary data relating to the channel numbers and channel names (e.g., type of content provided by the channel), as well as the program information currently available on the channels. The ancillary data relating to the channels is provided on the radio receiver display in scroll mode and other modes. The channel information can also be made available via other electronic means (e.g., via a system website), as well as via printed material. Users can therefore peruse the channel information to select channels to which to tune their radio receivers. The website can also be periodically updated (e.g., weekly) to inform users of upcoming broadcasts of interviews, live concerts and other content that is not generally part of the broadcast programming. The radio receiver is preferably provided with a number of buttons that can each be programmed by the user to tune to a selected one of the broadcast channels.

Occasionally, the programming center needs to make system changes to the number of channels and the types of programs broadcast on a particular channel in response to the demographics of the listeners. For example, the programming center can add channels to the broadcast signal, move a particular content format from an existing channel to another channel, remove a particular type of programming altogether from the available broadcast content, and so on. These types of changes can affect the preset channel button settings of a radio receiver. In accordance with the preset invention, the processing unit in a radio receiver is programmable to recognize system changes provided among other data in the ancillary data of the broadcast signal, to compare system changes to channels with preset button settings for channel selection at the radio receiver, and to automatically change the preset button settings when applicable. For example, if a particular type of programming is moved to a different channel by the programming center, the radio receiver is operable to automatically update a preset button setting for that type of programming to the new channel number.

In one embodiment of the invention, memory 115 stores channel identifier information for each channel in addition to channel number and channel name. In this embodiment, preset keys can be set to the channel identifier, which is hidden to the user, and does not change.

As stated previously, the programming center selects the content provided on each of the channels in the satellite broadcast signal. The satellite broadcast signal is preferably available continuously. The programming center therefore creates programming continuously for forthcoming broadcast transmission. Channel hosts, however, can respond to listener requests for particular songs and/or recording artists and inform the programming center of the requested content. The programming center can, in turn, instigate a programming change in the programming that has been planned for forthcoming broadcast to insert a requested song, as well as update the ancillary data transmitted with the song such that the title and artist name for the requested song will be displayed at a radio receiver tuned to that channel when the requested song is received.

In accordance with an embodiment of the present invention, the radio receiver is configured with a portable receiver unit that can be plugged into any of a plurality of docking stations. For example, a home adapter unit, a car adapter unit and a boombox unit can be provided. Each of these three types of plug-and-play docking stations has a connector (e.g., a male and/or female connectors) that accommodate a complementary connector on the portable receiver. The processing unit is programmed to determine the type of docking station the portable receiver is connected to based on signals available from the complementary connector and change preset settings according to the type of docking station. Preferably, the docking station contains a simple circuit connected to the connector which generates a voltage or current identifiable by the receiver when the receiver is connected to the docking station. In this manner the receiver is able to identify the type of docking station to which it is connected. For example, buttons on the radio receiver or remote control can have multiple functions that change depending on the type of docking station to which the receiver unit is connected. For example, +/− keys on the remote control can increment or decrement the channel number when the receiver is connected to a home adapter unit, but control the volume when connected to the boombox. The receiver can also store line out settings and volume control that change depending on the playback method, that is, whether the receiver unit is being used in the car or with the boombox.

As shown in FIG. 6, receiver 100 preferably connects to a docking station 124, which can be any of a plurality of docking station types, the types preferably including a home adapter unit, a car adapter unit, and a boombox. Processor 110 is adapted to identify docking station 124 and modifies the functionality of the display 114 and the functionality of certain user controls 112 based on the type of docking station to which the receiver 100 is connected.

FIG. 7 illustrates memory 115 in greater detail. Memory 115 stores data representing the channel name 118 for each channel presently being received by the receiver 100, the artist name 120 associated with the song presently playing on each channel, and the song name 122 of each song presently playing on each channel. As shown in FIG. 7, channel 44 has a channel name of "Fred" and is presently playing a song by the artist "Red Hot Chili Peppers" which has a song name of "Soul to Squeeze". Memory 115 is preferably large enough to accommodate channel name, artist name, and song name data for every channel which the receiver is capable of receiving. Memory 115 is also preferably capable of storing additional information for each channel such as category name and preset number.

Figure 8:
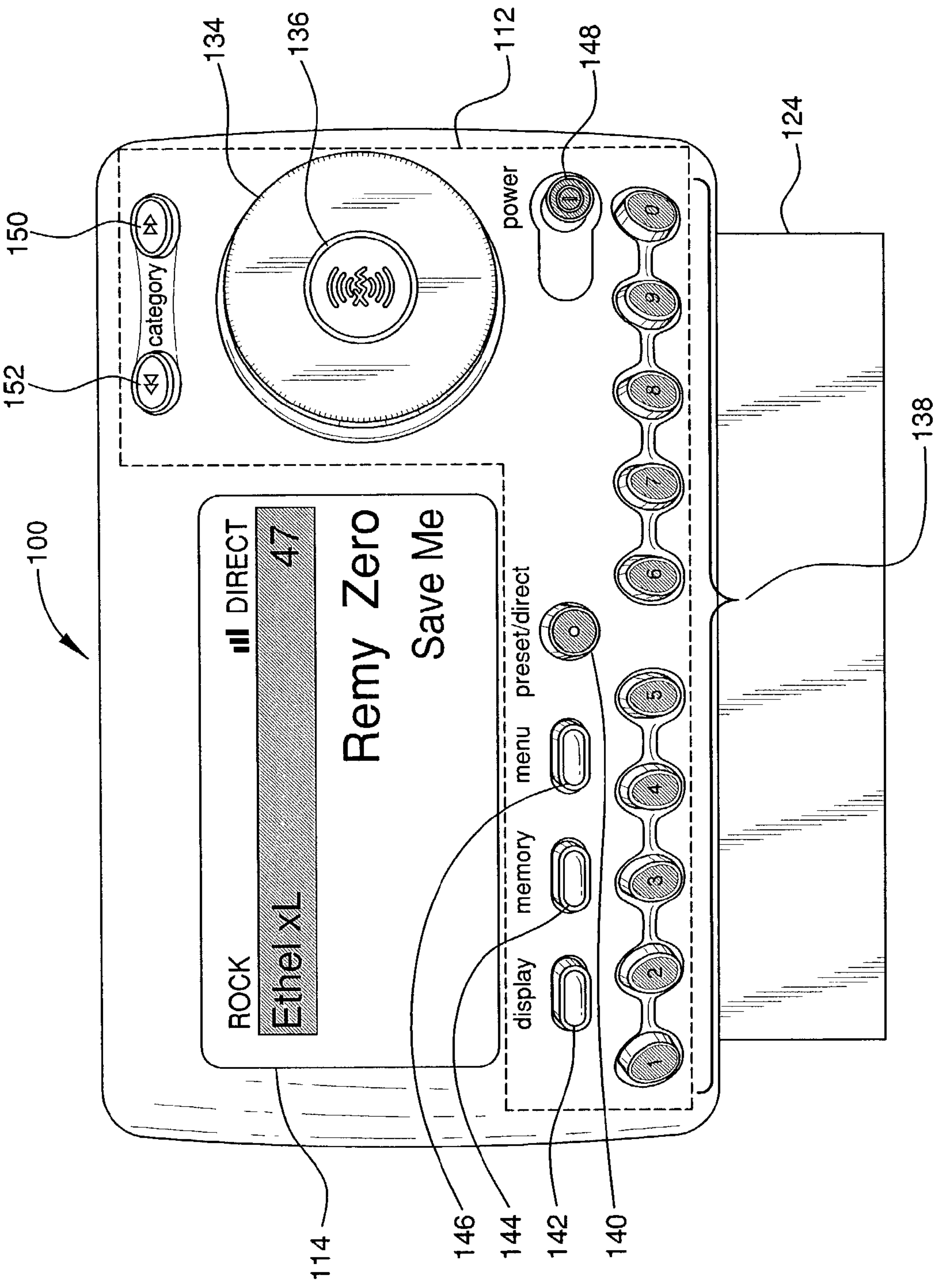
FIG. 8 is a front view of a receiver according to an embodiment of the present invention.
Figure 9:
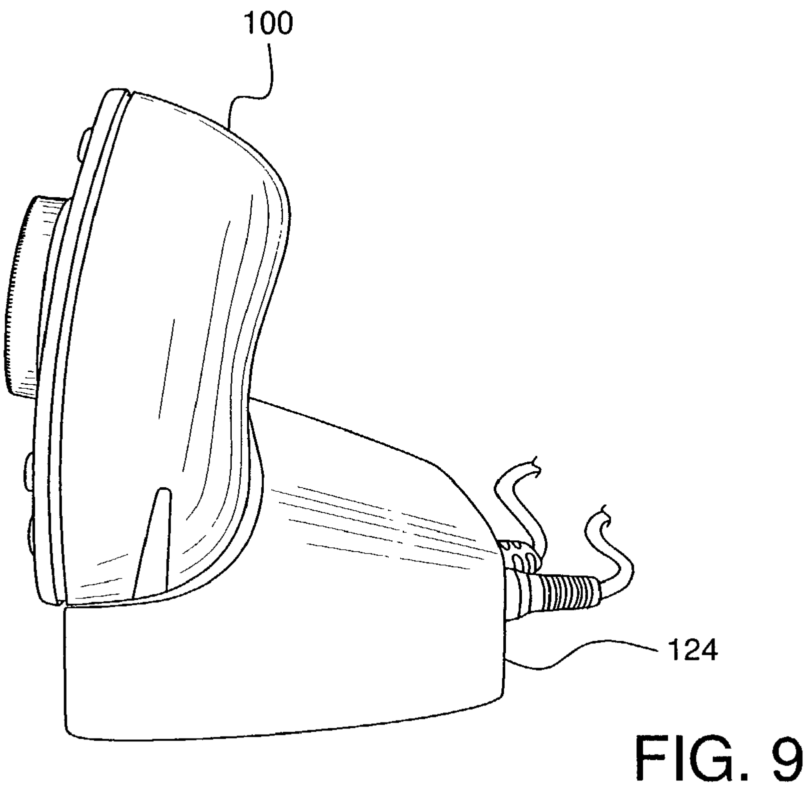
FIG. 9 is a side view of a receiver according to an embodiment of the present invention.
Figure 10:
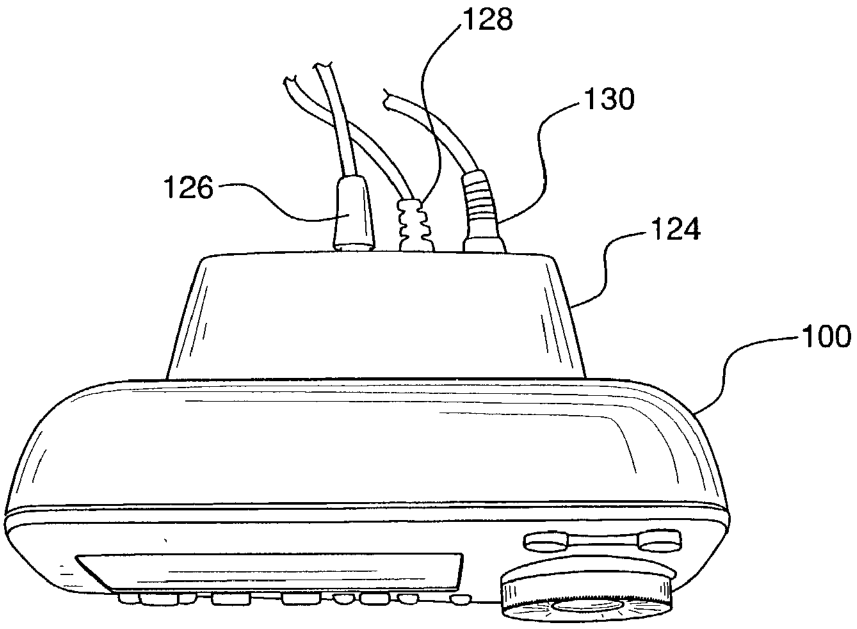
FIG. 10 is a top view of a receiver according to an embodiment of the present invention.

FIG. 8 illustrates a preferred embodiment of a receiver 100 according to the present invention. The receiver 100 has a sophisticated display 114 and controls 112 which together form a sophisticated user interface. Processor 110 controls display 114 in response to user inputs through controls 112 as well as realtime data stored in memory 115 as it is continuously updated. Receiver 100 is adapted to connect to any one of several docking stations 124. Receiver 100 is adapted to determine the type of docking station 124 to which it is connected, and is able to modify the user interface, including the function of user controls 112, the display 114 and audio output 116 based on the type of docking station to which it is connected. The manner in which user controls 112, display 114 and audio output 116 are varied depending on the type of docking station 124 to which receiver 100 is connected, as will be described in further detail below. FIG. 9 is a side view of receiver 100 as it is connected to docking station 124. FIG. 10 is a top view of receiver 100 connected to docking station 124. Also shown connected to docking station 124 are power connector 126, audio output 128 and antenna input 130.

Figure 11:
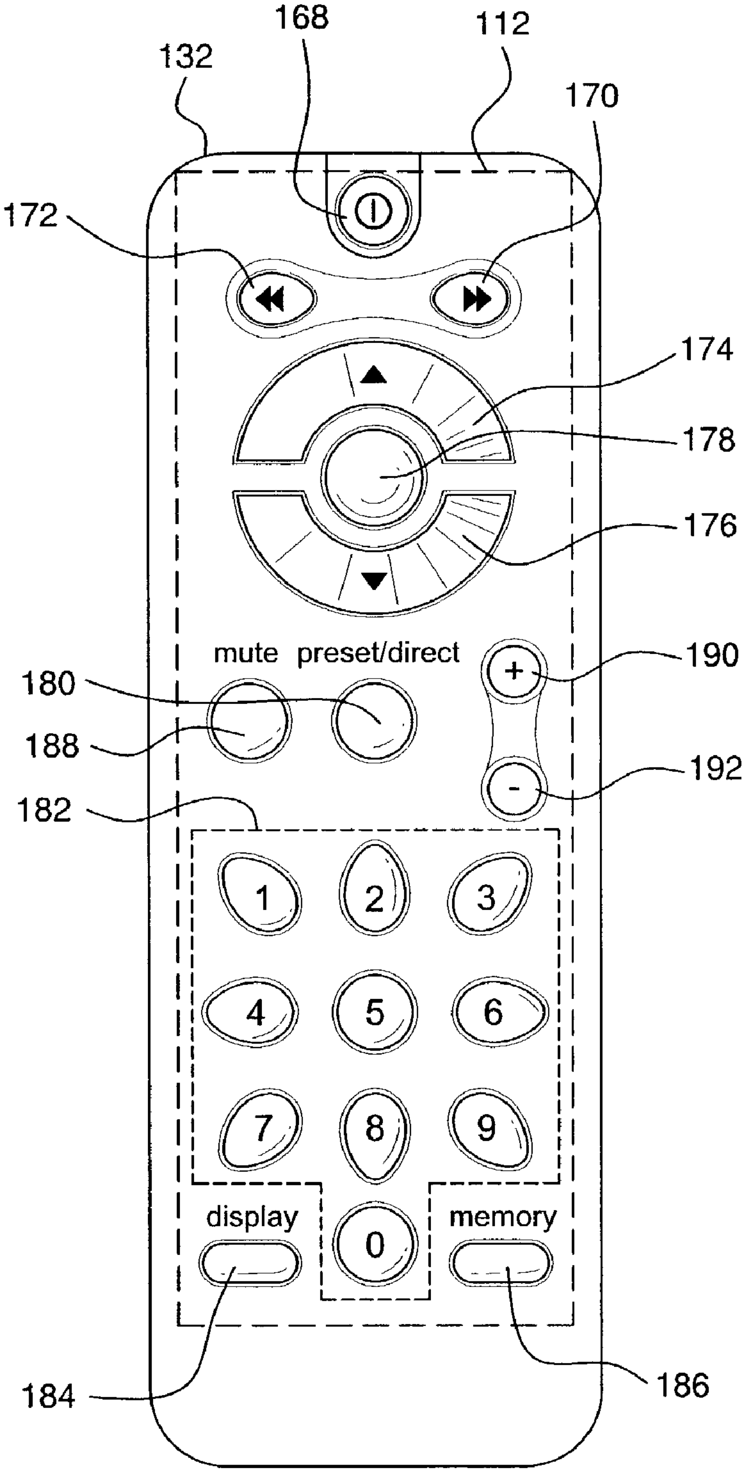
FIG. 11 illustrates an exemplary remote control adapted for use with a receiver according to an embodiment of the present invention.

FIG. 11 shows additional controls 112 embodied in a remote control 132. Remote control 132 can use infrared or radio frequency (RF) signals to communicate with the receiver 100, or alternatively could be a wired remote control. Similarly, Bluetooth, WiFi, and any other suitable technology is considered to be within the scope of the invention.

Referring back to FIG. 8, the controls 112 on receiver 100 will now be described in greater detail. Scroll wheel 134 is used to scroll through lists of selections presented on display 114. Examples of the types of lists which may be scrolled through include lists of available channel numbers, available channel names, lists of artist names associated with presently-playing songs on all available channels, lists of song names presently playing on all available channels, lists of menu options, lists of channels within a particular category, and lists of channels within a particular set of presets, among other possibilities. Selection button 136 is preferably located in the center of scroll wheel 134 and is used to select an item from any of the above-described lists. As an example, turning scroll wheel 134 may cause a list of available channel numbers along with the names of songs playing on each of those channels to be displayed and to scroll up or down as the scroll wheel is turned in one direction or the other. Subsequently pressing selection button 136 would cause receiver 100 to select the channel highlighted when scroll wheel 134 was turned. Pressing selection button 136 causes receiver 100 to begin supplying audio output 116 with signals corresponding to the selected channel, so that the user can listen to the selected channel. Alternatively, in the preferred embodiment of the invention, receiver 100 tunes to the highlighted channel if scroll wheel 134 is not turned for a predetermined amount of time, such as 2.5 seconds.

Numbered preset keys 138 are provided for selecting channels. The manner in which numbered preset keys 138 function is dependent on the status of a direct/preset setting in the receiver 100. Preset/direct button 140 toggles the unit through three channel selection modes. In “direct” mode, numbered keys 138 can be pressed in combinations corresponding to the digits of the desired channel number, as will be described in further detail below. In “preset A” mode, a first set of preset channels are assigned to each preset number button 138. Thus, the user can select one of the preset channels by pressing the appropriate numbered preset button 138. The channel numbers which are associated with each of the preset number buttons 138 can be programmed by the user as will be described in further detail below.

Thus, for example, if the user programs button number three to be associated with channel 44, when the user puts the unit in “preset A” mode and presses preset number button 3, the unit will switch to channel 44. In “preset B” mode, the preset number buttons 138 function as preset buttons for a second set of preset channels, which can also be programmed by the user. Thus, the user can program a total of 20 preset channels corresponding to ten channels for preset A and ten channels for preset B. Of course, the receiver 100 could be programmed to include more than two sets of presets, and the number of sets of presets is limited only by the receiver’s design.

Another feature of the receiver 100 is automatic updating of preset keys. If channels in the satellite broadcast system are reassigned to new channel numbers, the presets are automatically updated for the user. Slot control information 33 is inserted into the broadcast signal by programming center 18. The receiver 100 is thereby able to update the channel assignments in real-time by decoding the slot control 33 information. When the receiver 100 receives channel reassignment information in the slot control 33 portion of the broadcast signal, the receiver 100 preferably updates any user presets that have been affected. Thus, if for example the “Fred” channel was reassigned from channel 44 to channel 86, and the user had assigned preset A-4 to the “Fred” channel, the receiver 100 automatically reassigns preset A-4 from channel 44 to channel 86.

Display button 142 alters the display depending on the mode of the receiver 100, as will be described in further detail below. The memory button 144 is selected by the user to store certain information, as will be described in further detail below. The menu button 146 is used to enter a menu mode in which the user can select and alter the configuration of the unit, as will be described in further detail below. The power key 148 enables the user to turn the receiver 100 on and off. Category keys 150 and 152 enable the user to select a channel according to the category to which channels belong, as will be described in further detail below.

Figure 12:
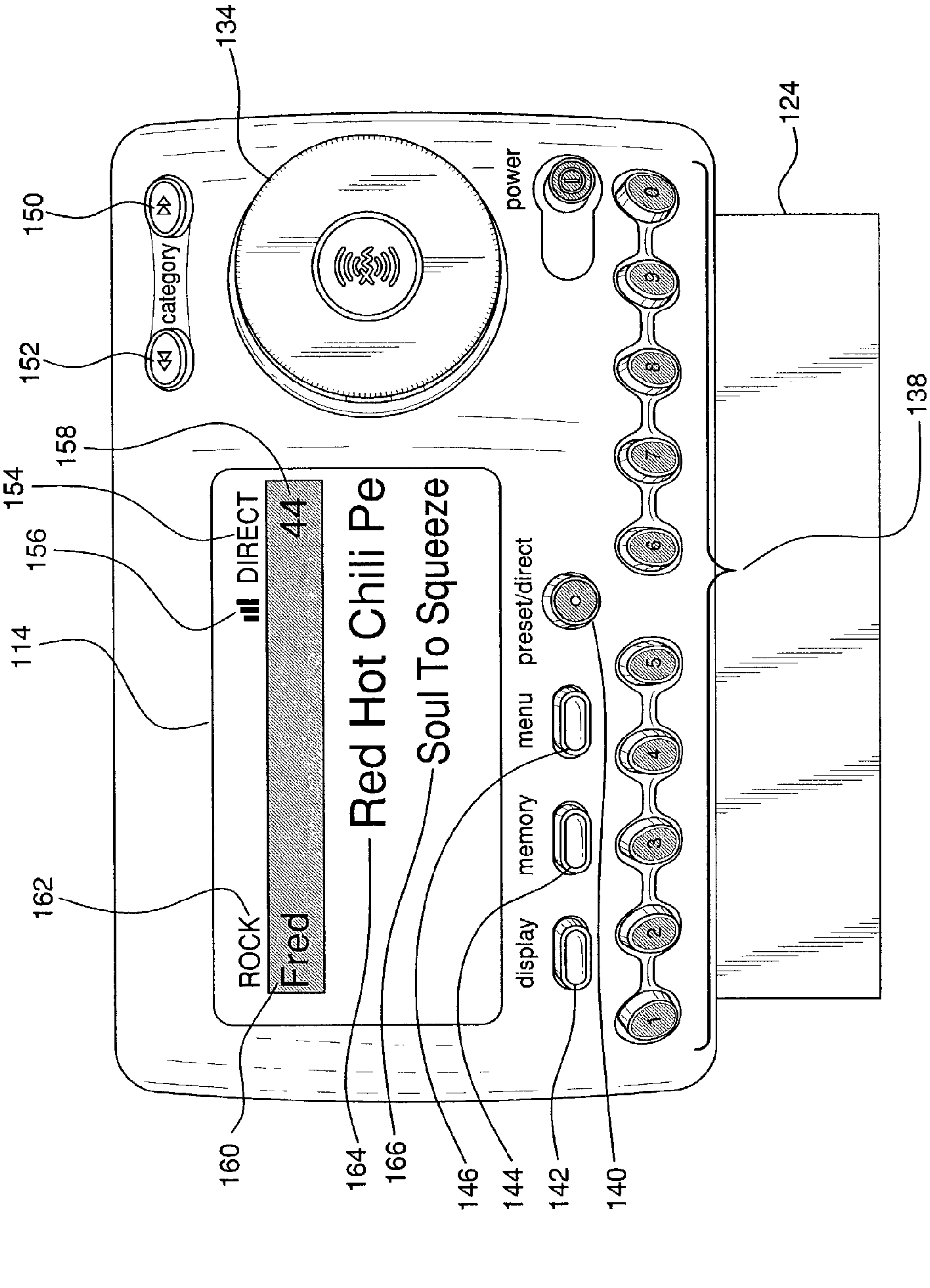
FIG. 12 demonstrates a screenshot of a display generated according to a system or method of the present invention.

Turning to FIG. 12, the display 114 will be described in greater detail. The display 114 describes information about the status of the receiver 100, the channel being played, as well as the song currently being broadcast. FIG. 12 depicts the unit under normal operating conditions, while it is in “direct” mode and while in a first display mode. Under this configuration, the status of the direct/preset mode is indicated at 154. The strength of the satellite broadcast signal being received is indicated by the number of bars shown at 156. The current channel number is shown at 158 and the channel name associated with the channel number is shown at 160. The category to which the channel belongs is shown at 162. The artist’s name is shown at 164 and the song title is shown at 166.

Referring back to FIG. 11, the control buttons on remote control 132 will now be described in greater detail. The control buttons 112 provided on remote control 132 provide similar functionality to the control buttons 112 provided on the receiver 100, and allow the user to control receiver 100 from a remote location. Power button 168 corresponds to power button 148 on the receiver 100. Category buttons 170 and 172 correspond to category buttons 150 and 152 on receiver 100. Scroll up button 174 and scroll down button 176 both correspond to scroll wheel 134 on the receiver 100. Scroll up button 174 corresponds to turning control scroll wheel 134 in one direction while scroll wheel 176 corresponds to turning scroll wheel 134 in the reverse direction. Selection button 178 corresponds to button 136 on receiver 100. Preset/direct button 180 corresponds to preset/direct button 140 on receiver 100. Preset number keys 182 correspond to preset number keys 138 on receiver 100. Display button 184 corresponds to display button 142 on receiver 100. Memory button 186 corresponds to memory button 144 on the receiver 100. A mute button 188 is provided on the remote control 132. The mute button 188 is used to temporarily silence the audio output from receiver 100, and the user toggles sound on and off with each subsequent press of mute button 188. The remote control 132 is also provided with a plus key 190 and a minus key 192, whose function depends on which docking station 124 the receiver 100 is connected to, as will be described in greater detail below.

A method of changing channels using the scroll wheel 134 or scroll buttons, 174, 176 will now be described. Under normal operating conditions, the receiver 100 will display the channel name, the channel number, the status of the direct/preset mode, the channel category, the artist name, and the song name in the display 114, as shown in FIG. 12. The user is able to change channels using scroll wheel 134 (or alternatively, scroll buttons 174 or 176 on the remote control 132). The scroll wheel 134 is preferably provided with a mechanical detents such that the user experiences tactile bumps or clicks or the like as they rotate scroll wheel 134. The bumps or clicks correspond to incrementing through the relevant lists, such as the list of channel numbers. When the user turns scroll wheel 134 the display 114 changes from a normal information display as shown in FIG. 12 to a list of channel names and numbers shown in FIG. 13A. Channel number 44 and channel name “Fred” is shown highlighted in the middle of display 114. Also shown in the display are the two proceeding channels, channels 42 and 43 and the two subsequent channels 45 and 46. As the user continues to turn scroll wheel 134, the list of channels displayed will scroll up or down depending on the direction in which the scroll wheel 134 is turned, such that a new channel can be selected by refraining from turning the scroll wheel 134 when the desired channel is shown highlighted in the middle of the display 114. Once a new channel is selected, the display returns to a normal information display as shown in FIG. 12 with the updated selected channel information.

It should be noted that the function of scroll wheel 134 and scroll buttons 174 and 176 can differ slightly. For example, when scroll wheel 134 is turned one click or bump, the receiver 100 is programmed to assume that the user wants to change the channel, thus if the user turns the scroll wheel 134 up when the current channel number is 44, the highlighted channel in the middle of display 114 would be channel 45. Similarly, if the user turned scroll wheel 134 down when the current channel was 44, the first highlighted channel on the list display shown in FIG. 13A would be channel 43. However, if the user pressed scroll up button 174 on the remote control 132, the highlighted channel in the list display of FIG. 13A would be channel 44. Thus the user would be required to press the scroll up button 174 on remote control 132 twice to actually change the channel.

Also, when scroll wheel 134 is turned, the unit changes to the highlighted channel if the scroll wheel remains inactive for a certain period of time, such as for example one second. However, when scroll buttons 174 or 176 on remote control 132 are used, a new channel is not selected until the select key 178 is pressed. Thus, if the user presses the scroll buttons 174 and 176 in any combination or any sequence, but they do not subsequently press the selection button 178, then the display 114 will return to the information display for the previously selected channel after a certain period of time (e.g., three seconds), and the audio for that channel will continue to play throughout this process.

Figure 13A:
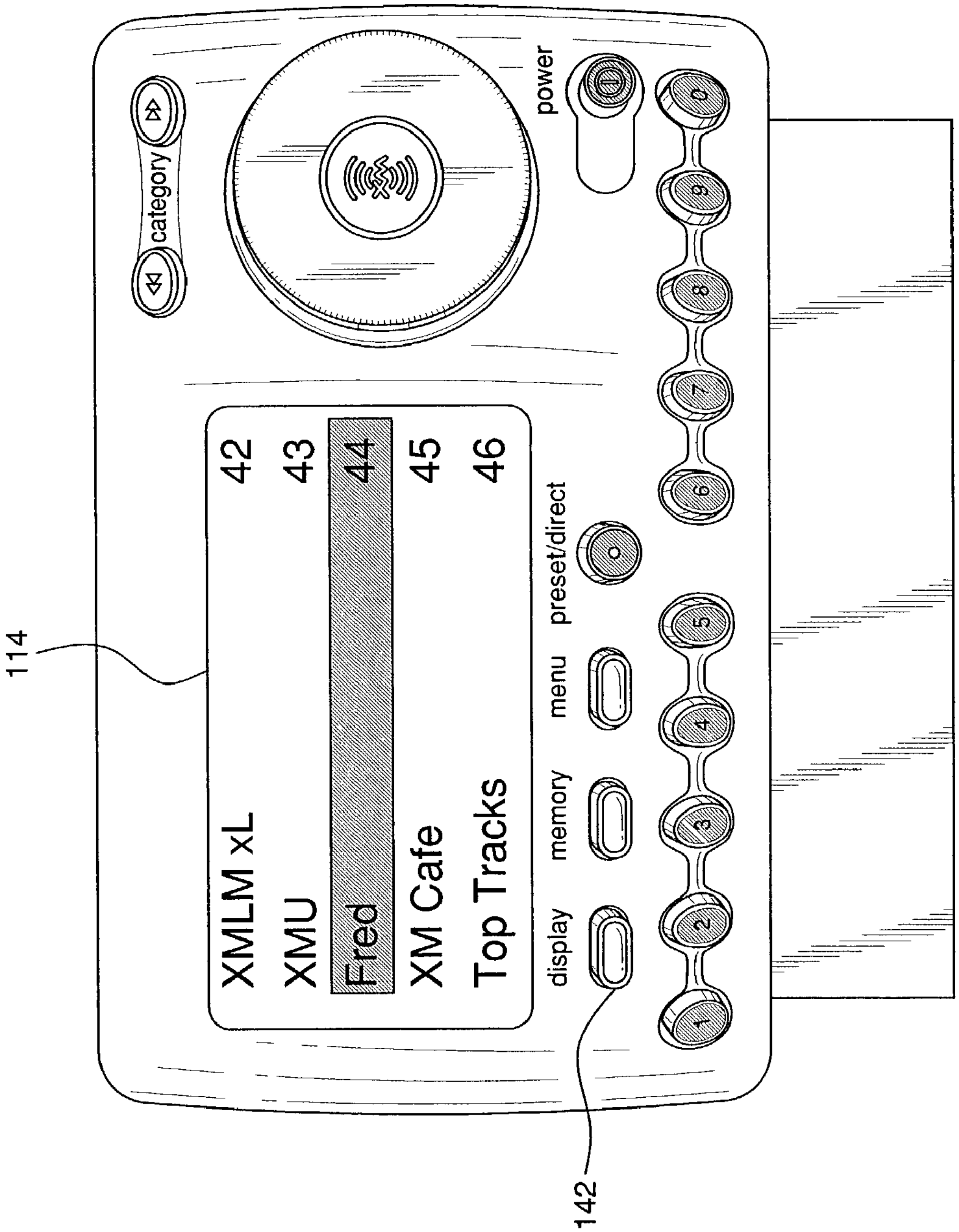
FIG. 13*a* demonstrates a screenshot of a display generated showing a list of channel names according to a system or method of the present invention.
Figure 13B:
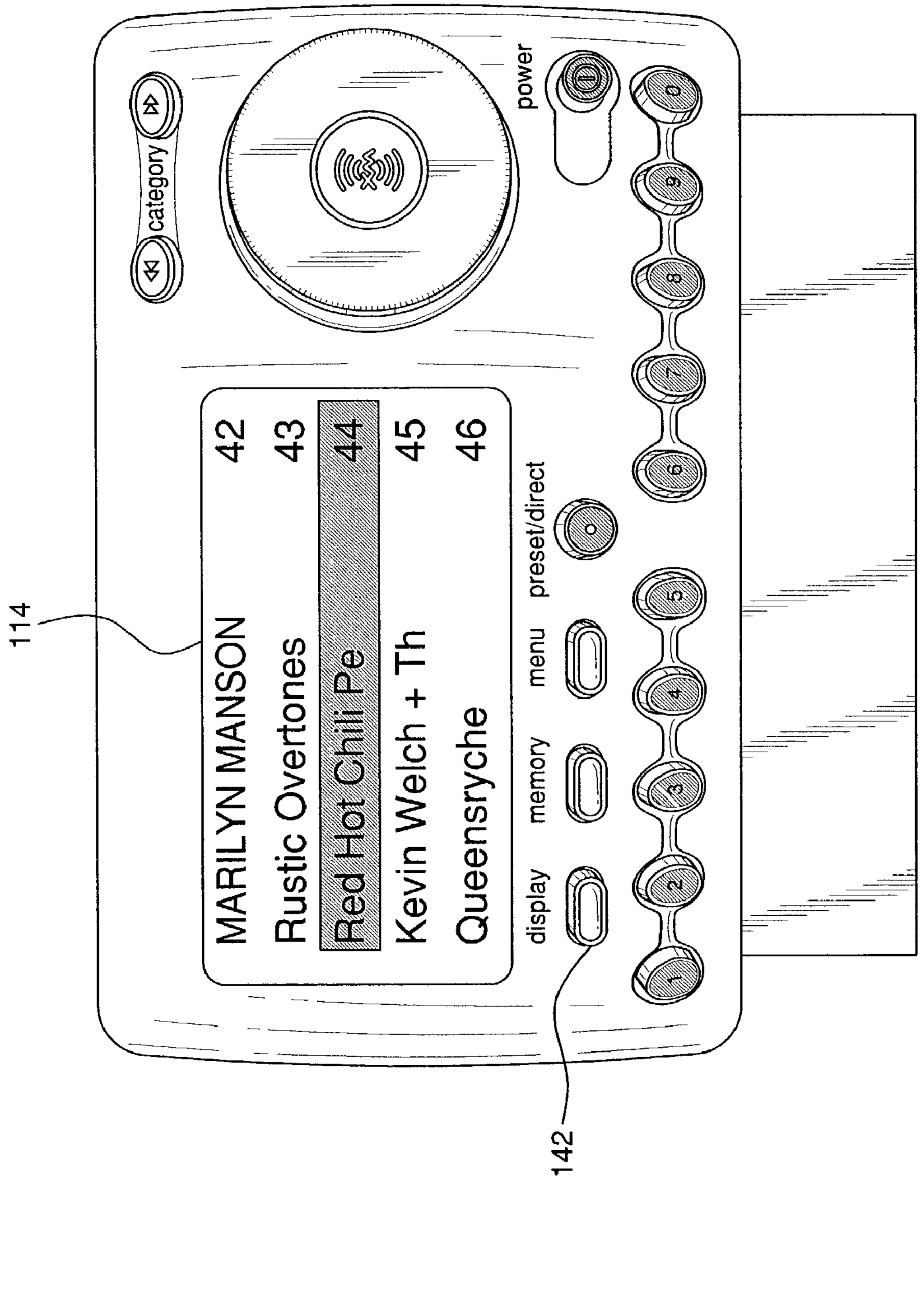
FIG. 13*b* demonstrates a screenshot of a display generated showing a list of artist names according to a system or method of the present invention.
Figure 13C:
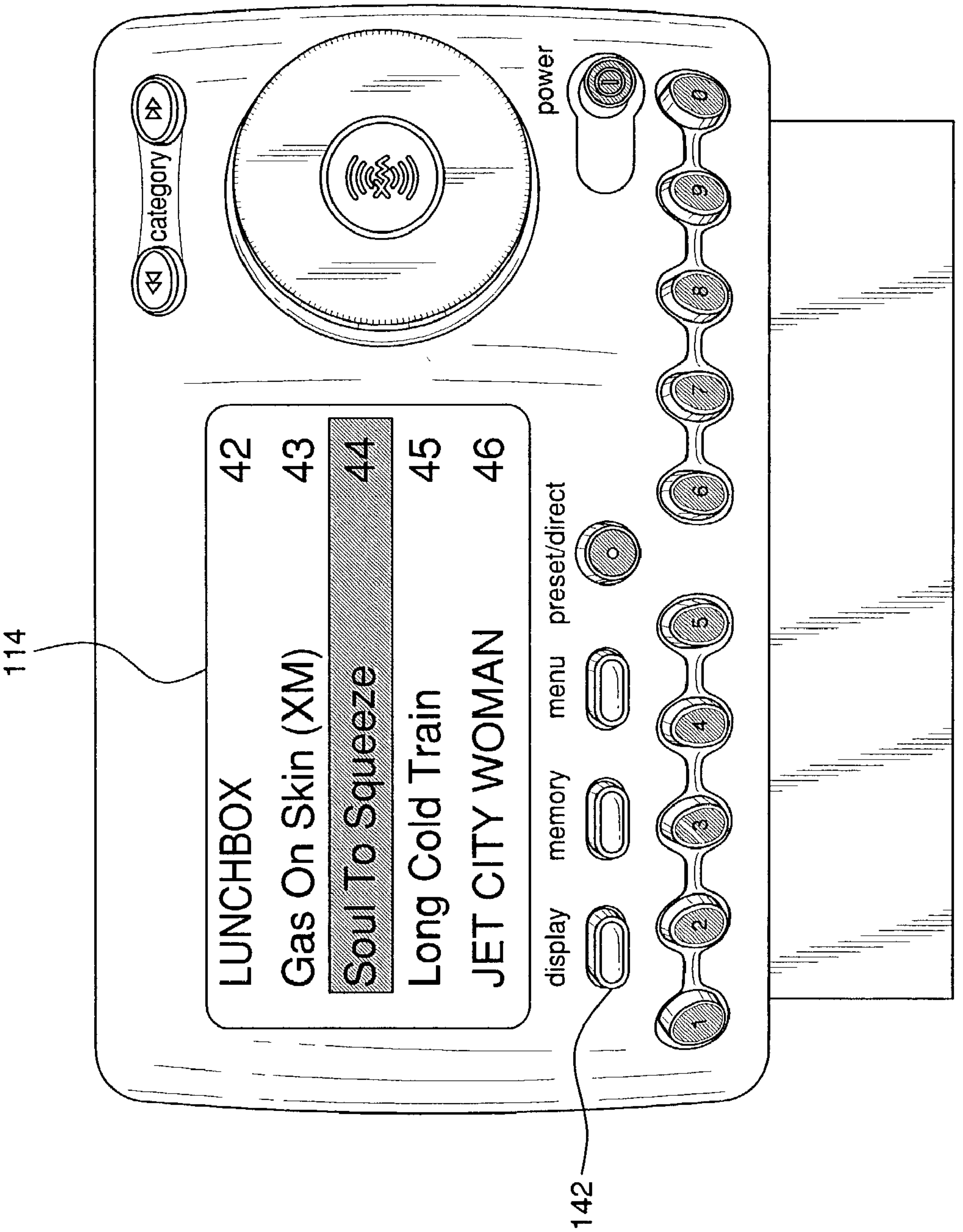
FIG. 13*c* demonstrates a screenshot of a display generated showing a list of song names according to a system or method of the present invention.

The functionality of the display buttons 142 and 184 will now be described. The user is able to change the display 114 to provide different information or information in different formats by depressing the display key 142 or the receiver 100 or the display key 184 or the remote control 132. For example, when the display 114 is in a channel list display such as that shown in FIG. 13A, showing channel numbers and channel names, when the user presses the display button 142, 184 the unit switches to display the artists' names associated with each channel number as shown in FIG. 13B. Pressing the display button 142, 184 again causes the display to show the song names associated with each channel number as shown in FIG. 13C. Pressing the display button 142, 184 again returns the unit to displaying the channel names, as shown in FIG. 13A.

Figure 14A:
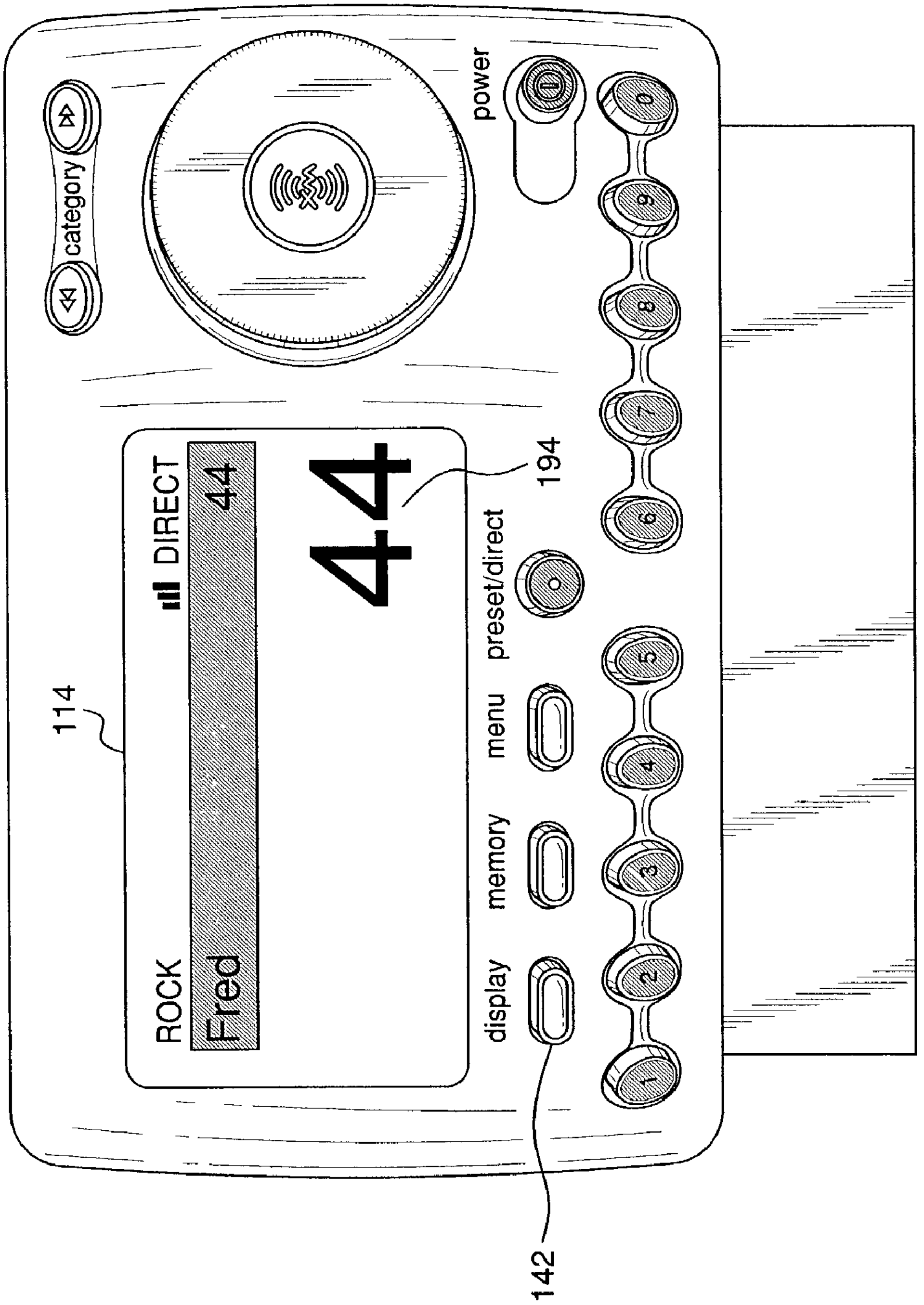
FIG. 14*a* demonstrates a screenshot of a display generated showing a large font channel number display according to a system or method of the present invention.
Figure 14B:
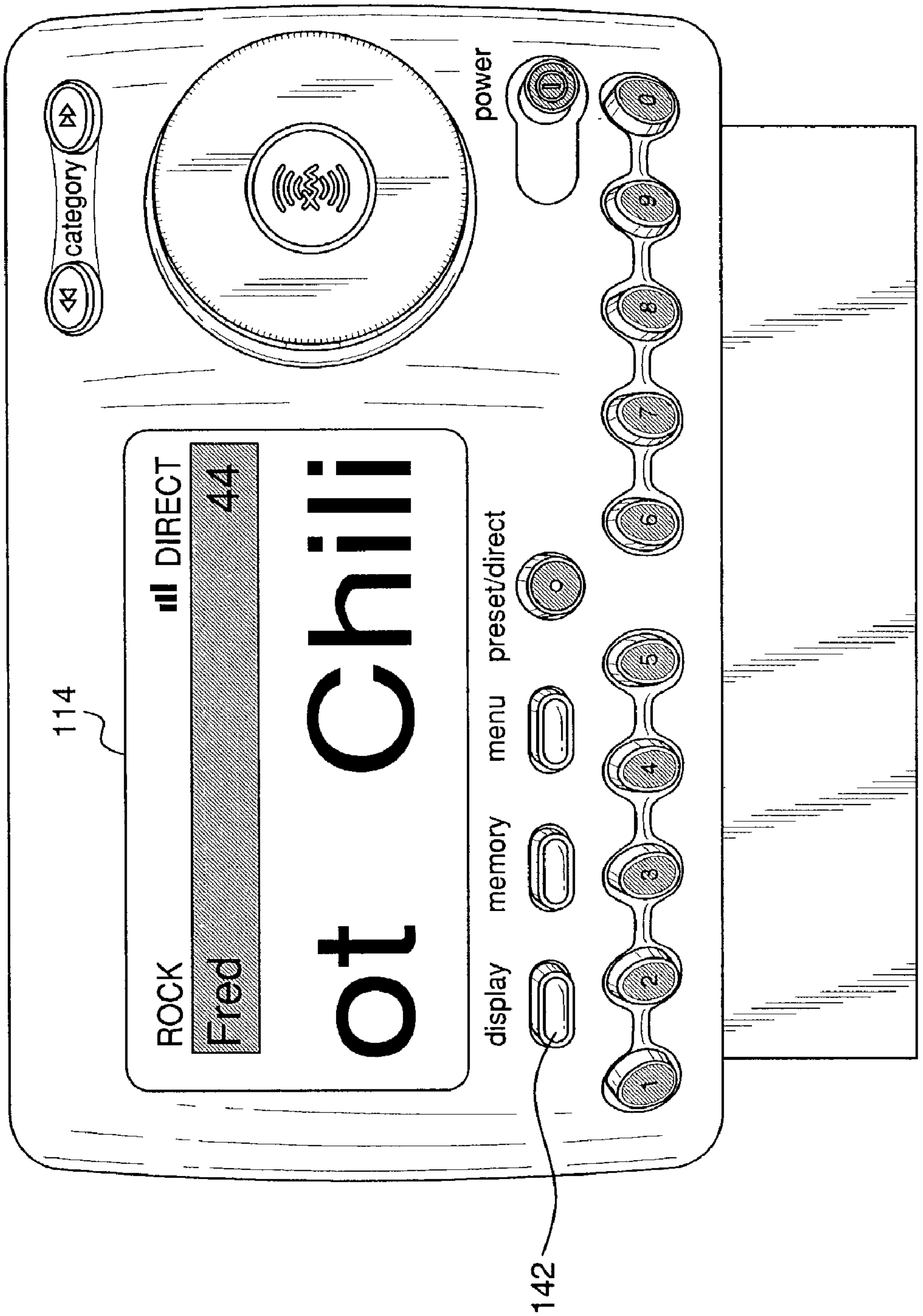
FIG. 14*b* demonstrates a screenshot of a display generated showing a scrolling artist name and song name in large font according to a system or method of the present invention.
Figure 14C:
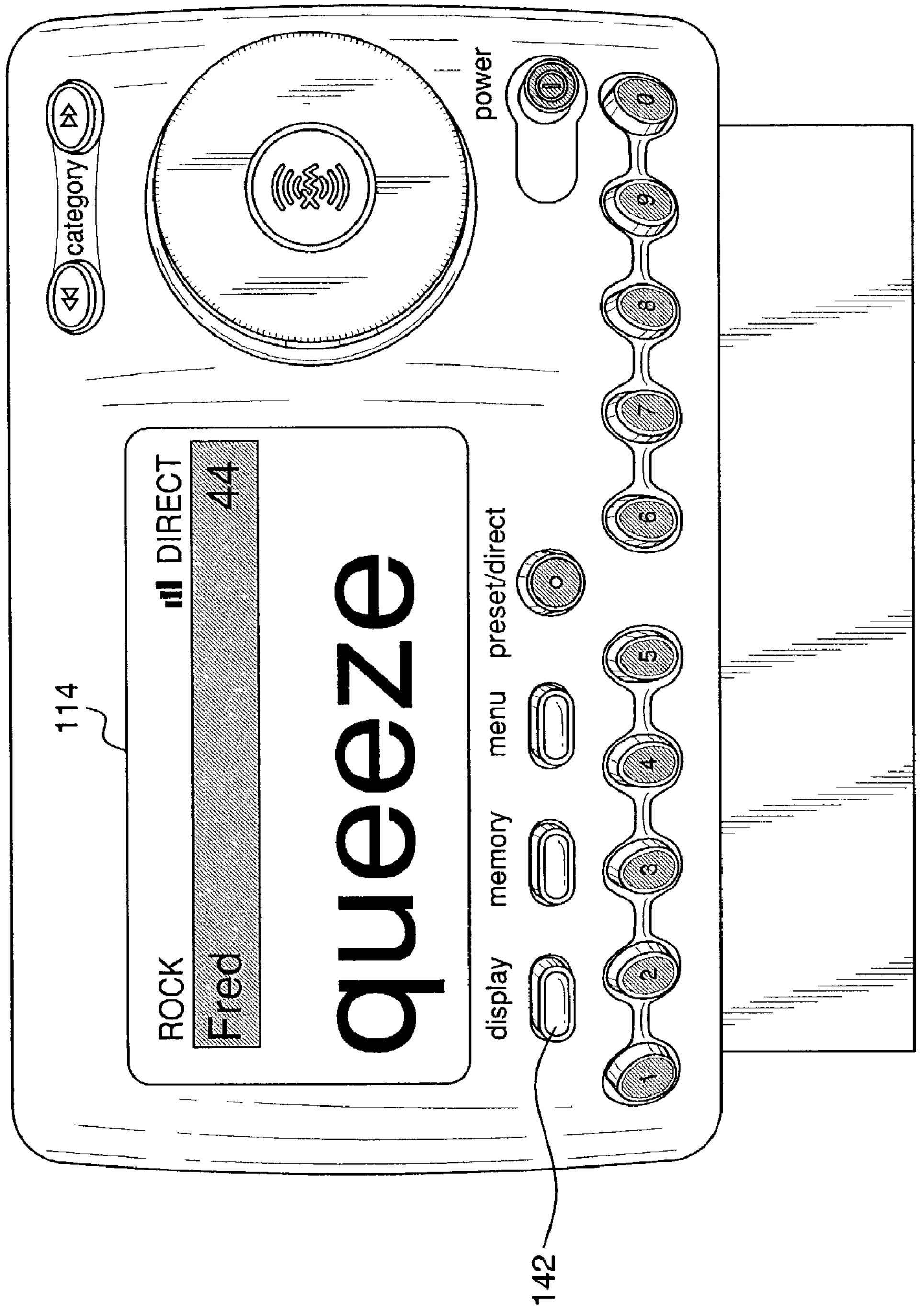
FIG. 14*c* demonstrates a screenshot of a display generated showing a scrolling artist name and song name in large font according to a system or method of the present invention.

The display button 142, 184 provides alternate functionality when receiver 100 is in normal information display mode, as shown in FIG. 12. When in normal information display mode, and the display button 142, 184 is pressed by the user, the display changes to a large channel number display. As can be appreciated, large font displays are advantageous for reading the display 114 from a remote distance. As shown in FIG. 14A the artist name and song name are removed from the display and the channel is displayed in large font format as indicated at 194. If the display button 142, 184 is pressed again, the receiver 100 changes the display 114 to show the artist's name and song name in a large font mode as illustrated in FIGS. 14B and 14C. As shown, depending on the size and configuration of the display 114, the artist's name and song name in large font may not fit within the display window 114. Under these circumstances, the artist's name and song name are scrolled horizontally across the display 114 as indicated in FIGS. 14B and 14C. Pressing display button 142, 184 again, returns the display 114 to the normal information display mode as shown in FIG. 12.

The function of category keys 150 and 152 (and category buttons 170, 172 on remote control 132) will now be described. Music channels and talk channels can be placed in one or more categories according to the type of music or content that is typically played on the channel. For example, some channels typically play rock music, some channels typically play urban music, while other channels typically play jazz music and so on. Talk channels may be organized by category such as news, sports, comedy, entertainment, and the like. In a satellite broadcast radio system according to the present invention, when over one hundred channels are available, it is advantageous to be able to view small lists of channels that belong to a particular category, rather than one large list of all channels available.

Thus, according to an embodiment of the present invention, each channel can be assigned to one or more categories. Users are then able to use the category buttons 150, 152 (and buttons 170, 172 on remote control 132) in conjunction with scroll wheel 134 (or scroll buttons 174, 176) to select a channel in a particular category. When a category button 150, 152, 170, 172 is pressed, display 114 changes to display the current category as shown at 196 in FIGS. 15A and 15B. Also a list of channels within that category is displayed as shown. The functionality of the display button 142, 184 works as described above, in that each press of the button cycles the information displayed between channel name, artist name and song name. Scroll wheel 134 and scroll buttons 174, 176 can be used to select from the list displayed.

Figure 15A:
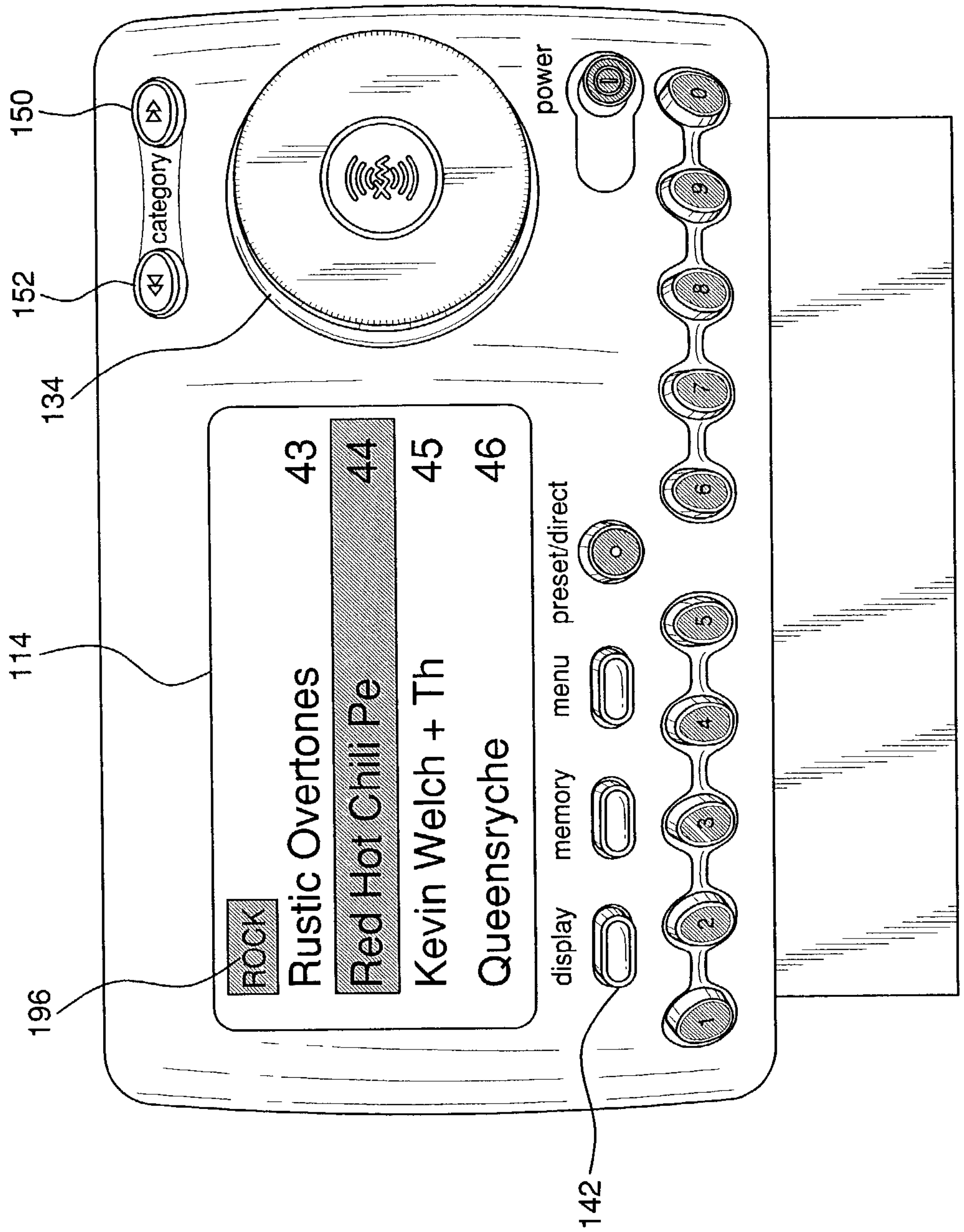
FIG. 15*a* demonstrates a screenshot of a display generated showing a list of channels available in a particular category listed by currently playing artist name according to a system or method of the present invention.
Figure 15B:
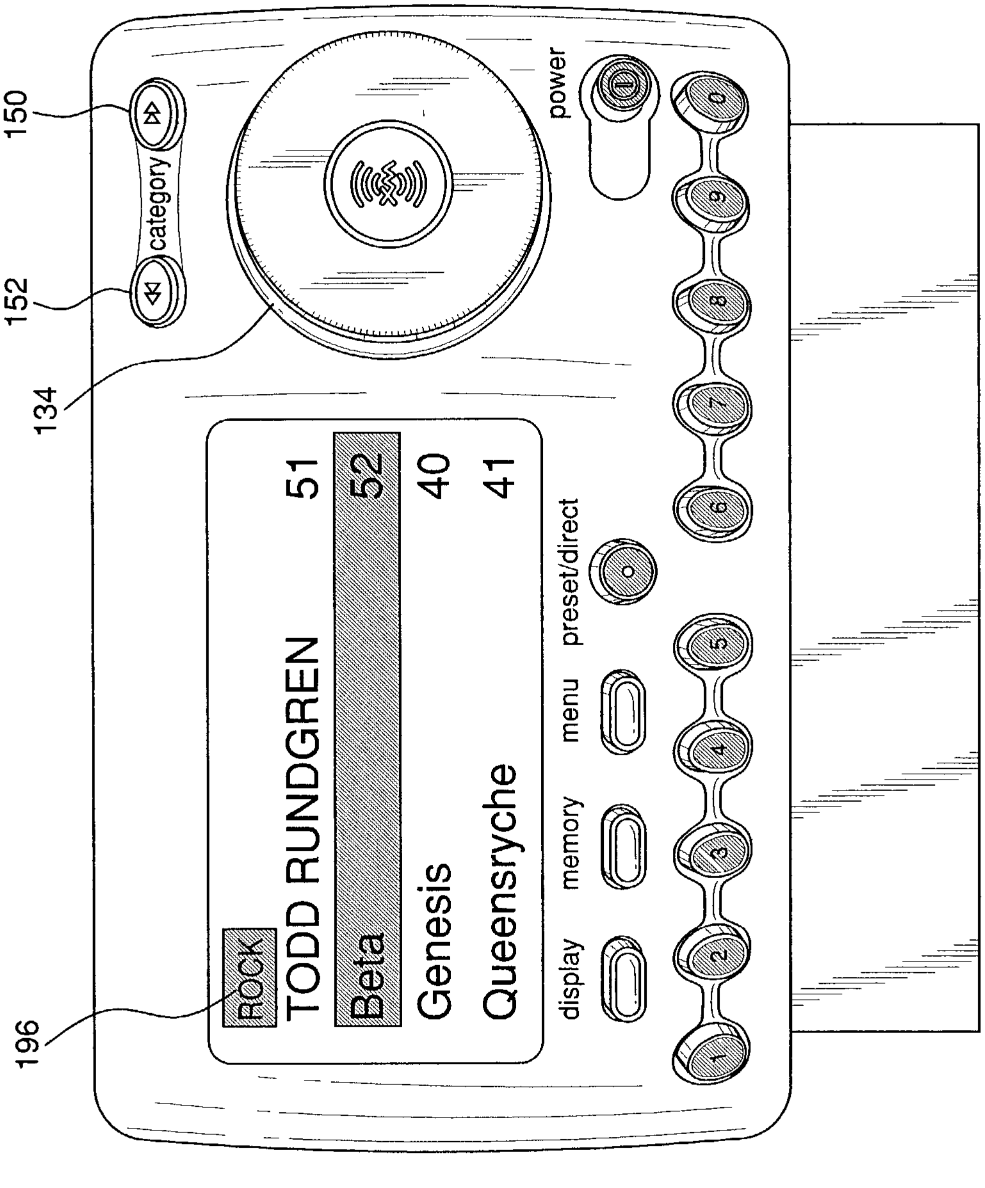
FIG. 15*b* demonstrates a screenshot of a display generated showing a list of channels available in a particular category listed by currently playing song name according to a system or method of the present invention.

As shown in FIGS. 15A and 15B there are four lines available on display 114 for displaying channel numbers and the information associated with that in addition to the category label 196. When there are more than four channels in a particular category, using the scroll wheel 134 and scroll buttons 174, 176 causes the items in the list to move up or down in the display, depending on the scroll direction. When the last item in the list is reached, the display cycles back to the first item in the list if the scroll wheel 134 continues to be turned or the scroll buttons 174, 176 pressed.

Figure 15C:
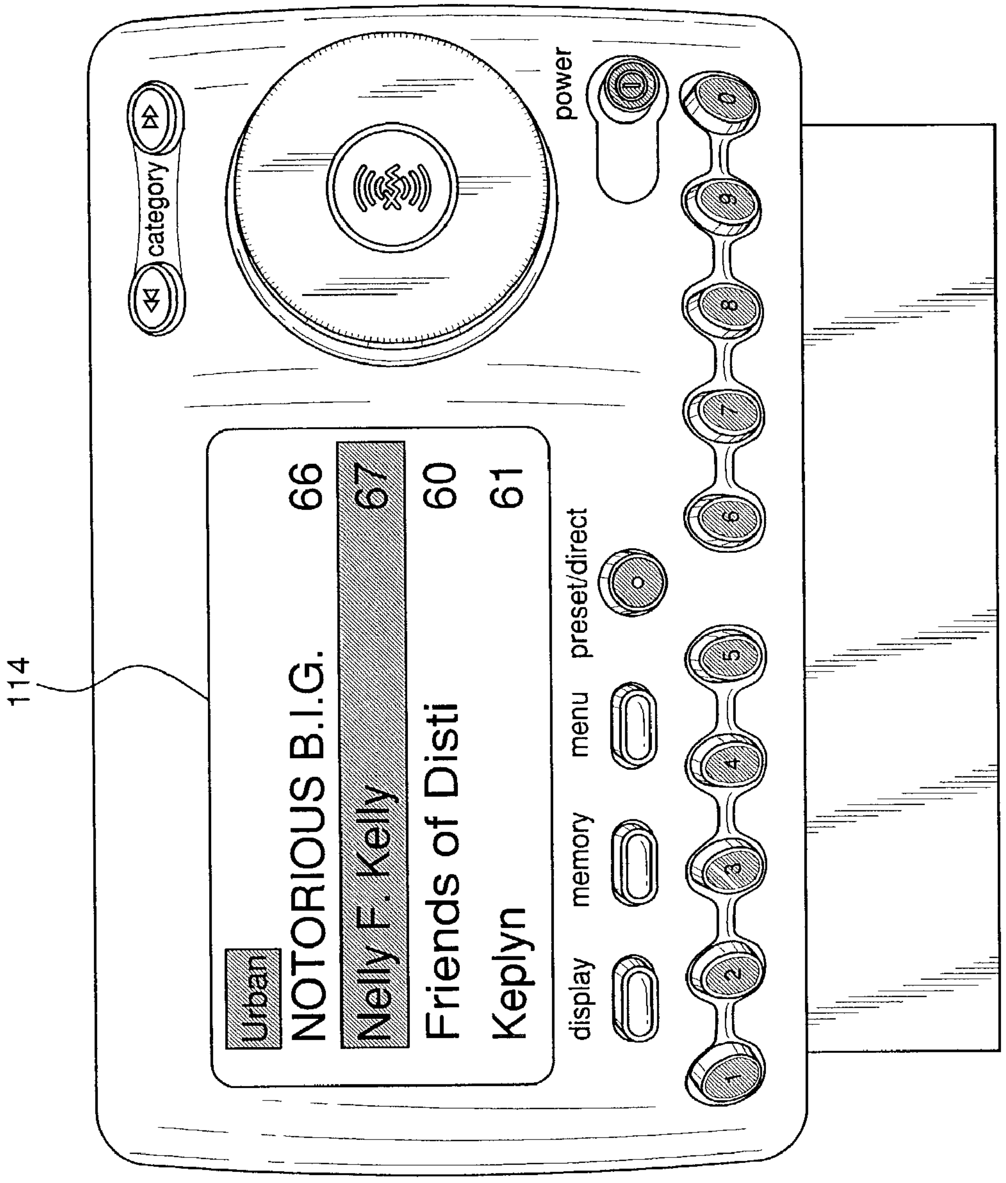
FIG. 15*c* demonstrates a screenshot of a display generated showing a list of channels available in a particular category listed by currently playing artist name according to a system or method of the present invention.

As shown in FIG. 15B, the list of channels in the rock category extends from channel 40 through 52. Thus, as the list scrolls down past the last channel number, channel 52, channel 40 is displayed again. FIG. 15C demonstrates the display 114 after category buttons 150, 152 are used to select the "urban" category. As shown, channel 60 through 67 belong to the urban category and can be selected by rotating the scroll wheel 134 or pressing the scroll buttons 174, 176 on the remote control 132. It should be noted that although the exemplary screen shots show consecutive channel numbers in a particular category, that is not any set of channel numbers can belong to a particular category and they need not be consecutive channel numbers.

Figure 16:
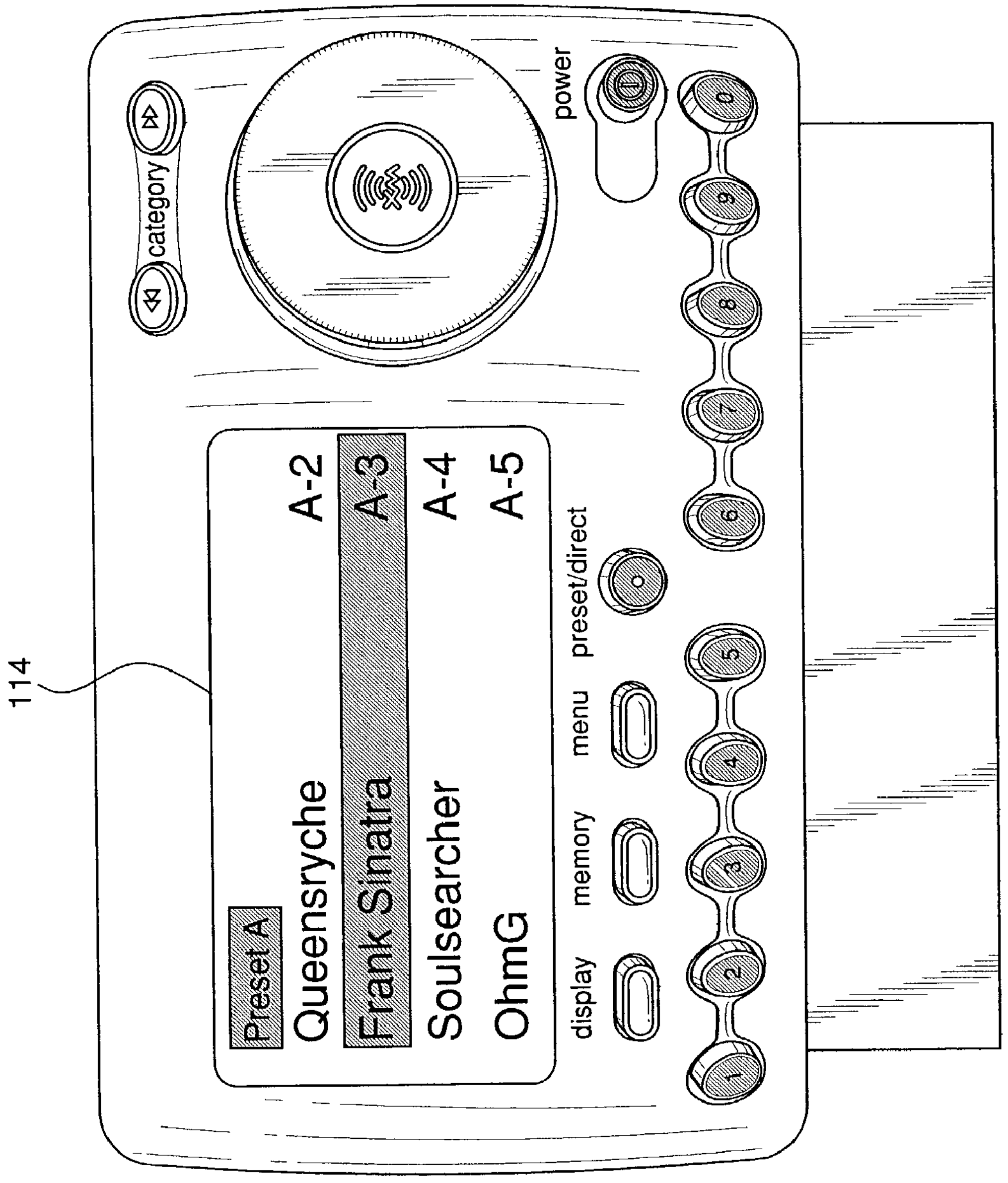
FIG. 16 demonstrates a screenshot of a display generated showing a list of preset channels available listed by currently playing artist name according to a system or method of the present invention.

According to an embodiment of the present invention, each set of presets also functions as a "category." Thus, when the user presses the category buttons 150, 152, 170, 172 in addition to music categories, such as rock, urban, jazz, etc., there will be available a category for each set of presets, which are displayed as shown in FIG. 16. The channel numbers shown will the preset numbers corresponding to preset buttons 138, 182.

The direct method of channel entry will now be described in greater detail. The user selects a preferred method of channel selection using the preset/direct button 140 (button 180 on remote control 132). In order to select the "direct" entry method, the user would press the preset/direct button 140 until display 114 displays the term "direct" at location 154 (see e.g. FIG. 12). Once in direct entry mode, the user is able use numbered keys 138, 182 to key in the number of the channel they wish to select. Thus, for example, the user can select channel 65 by pressing "6" followed "5."

Figure 17A:
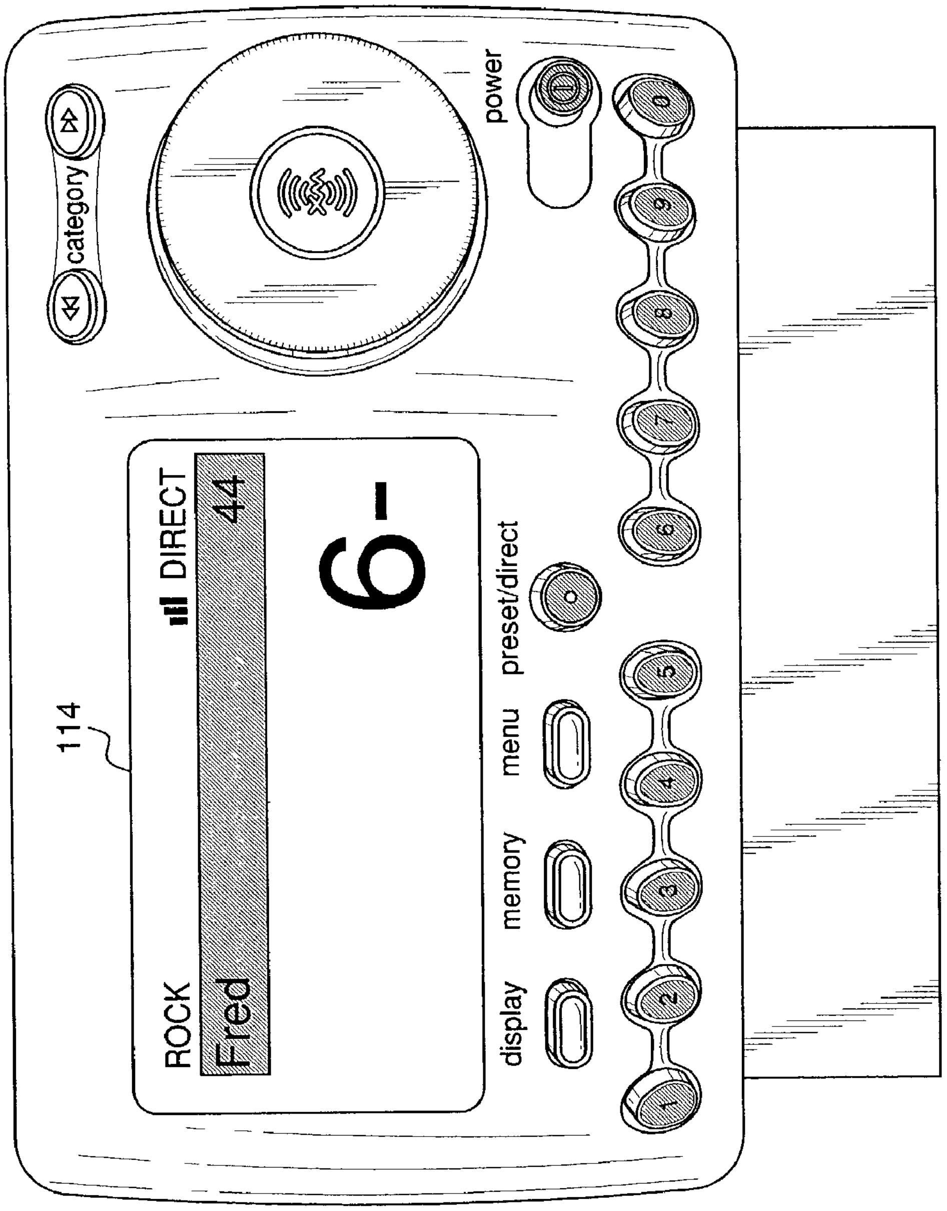
FIG. 17*a* demonstrates a screenshot of a display illustrating direct channel number entry according to a system or method of the present invention.

Receiver 100 is programmed to intelligently determine a minimum number of key strokes necessary to select a channel, based on the channel number available. When in direct entry mode, when the user depresses the first number button 138, the display 114 changes to reflect the button pressed by the user as shown in FIG. 17A. The display also reflects the maximum number digits which the selected channel might have based on the first digits selected by the user. Thus, if for example the highest channel number were channel 150, and the user first selected button "6", a two-digit display as shown in FIG. 17A is generated because the channel number beginning with "6" cannot be greater than two digits. The second digit is indicated as a dash while the unit waits for the user to input a second digit from the number buttons 138. If the user selects a second number, such as "4" for instance, the unit will immediately switch to channel 64, along with a display similar to the normal information display as shown in FIG. 12. If however the user intended to select channel 6 rather than 64, the unit would generate a display such as that indicated in FIG. 17A to reflect the selection of the "6" digit, and the receiver 100 would wait a predetermined amount of time for the user to select a second digit. If the predetermined amount of time elapses without a second digit being selected by the user, then the unit determines that the user intended to select channel 6 rather than a channel in the range of 60 through 69, and then changes to channel 6. The user also has the option of using the selection key 136, 178 to indicate to the unit that they have finished entering digits. Upon receipt of the selection key 136 and 178, the unit immediately changes to the channel indicated by the digits pressed.

Figure 17B:
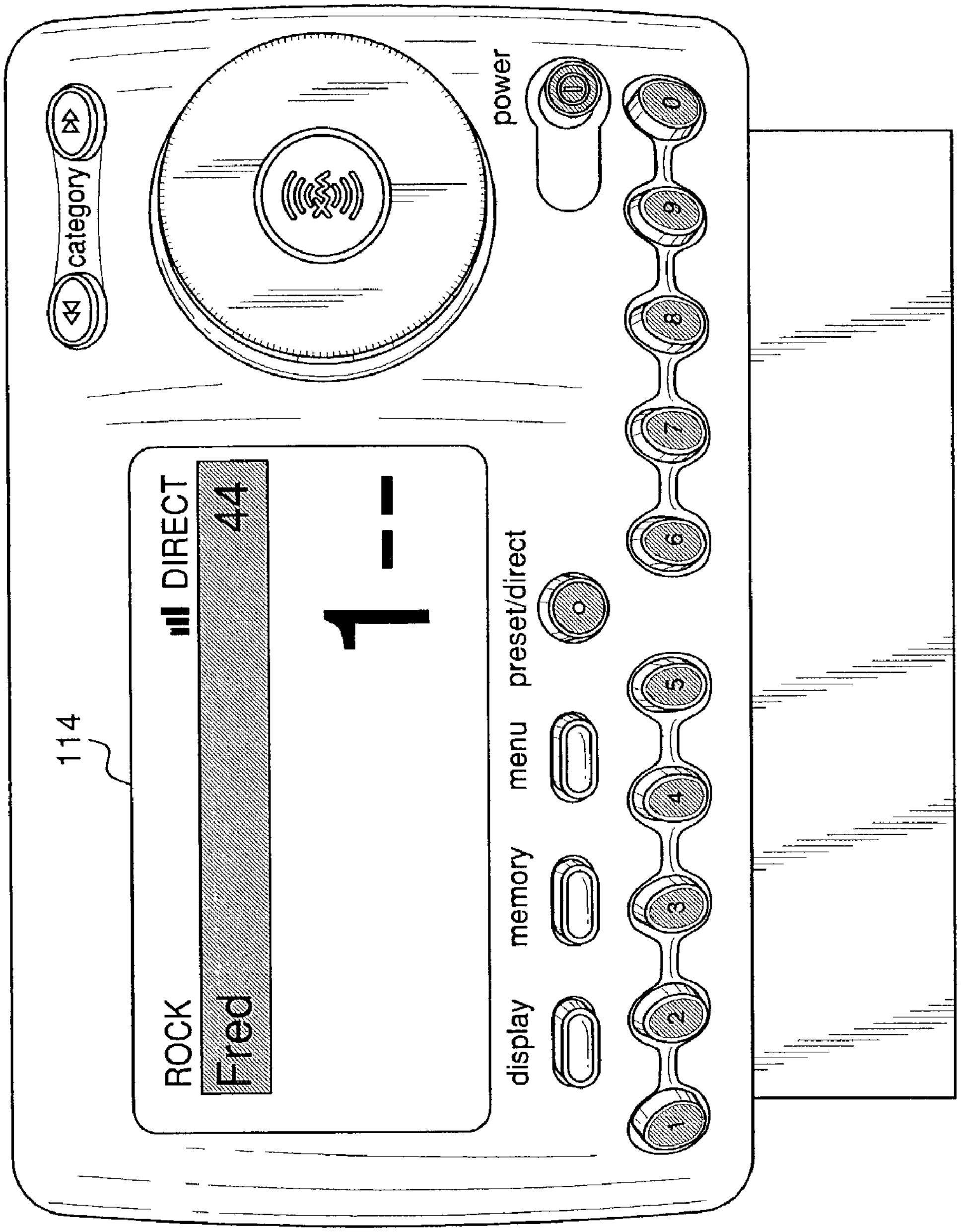
FIG. 17*b* demonstrates a screenshot of a display illustrating direct channel number entry according to a system or method of the present invention.

If the first digit selected by the user while the receiver 100 is in direct entry mode indicates that the channel number could include three digits, then the display reflects three digits as shown in FIG. 17B. The unit continues to provide a timeout period which is reset after each user entry until either the unit resolves that only one possible channel number could be intended, or the timeout period has elapsed. Thus, for example, if the highest channel number is 150 and the user selects "1" followed by "2", the display will reflect "12-" and remain in that state until either the user selects a third digit, the user selects the selection key 136, 178 or the timeout period elapses. If however the highest channel number is 150 and the user selects digit "1" followed by "6", because there are no channels above 159, the receiver 100 immediately switches to channel 16 without waiting for the timeout period to elapse.

Figure 18A:
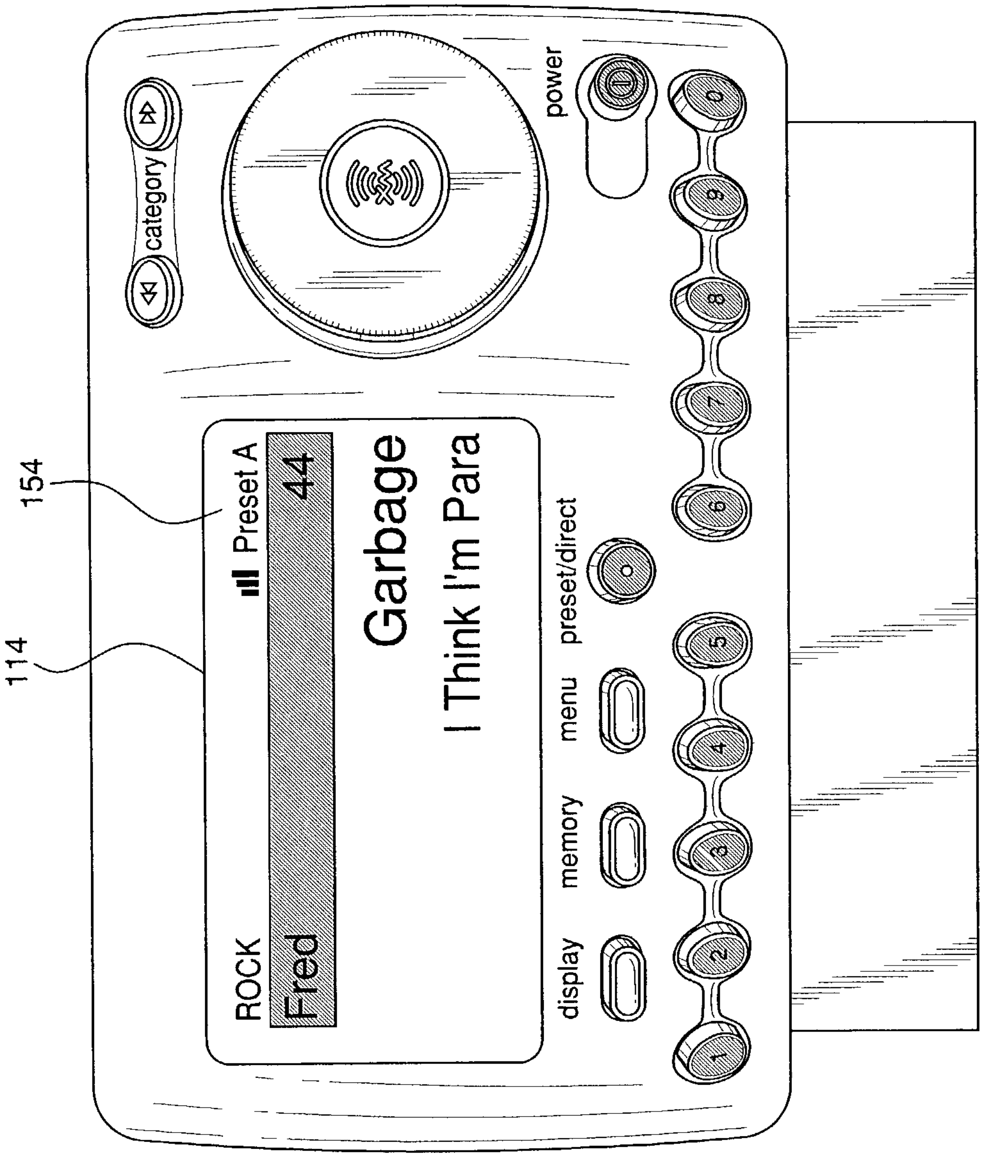
FIG. 18*a* demonstrates a screenshot of a display generated during normal playback of a preset channel according to a system or method of the present invention.
Figure 18B:
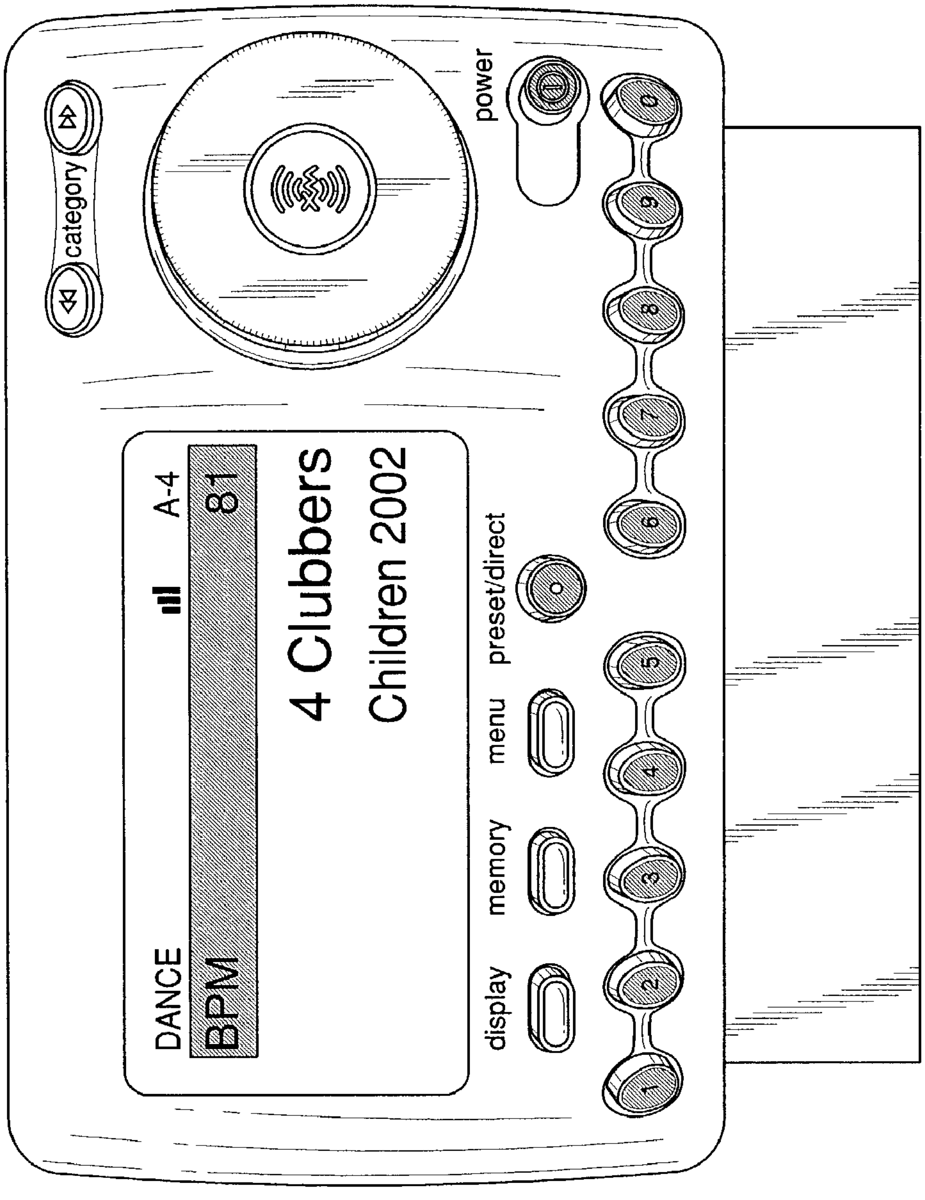
FIG. 18*b* demonstrates a screenshot of a display generated during normal playback of a preset channel according to a system or method of the present invention.

The "preset" method of selecting channels will now be described in greater detail. FIG. 18A illustrates the display 114 after the user has used preset/direct button 140, 180 to select the preset mode. The display 114 indicates preset A at 154 (or alternatively simply "A"), to indicate that the receiver 100 is in preset mode. In this mode numbered keys 138 or 182 are used to directly select one of ten possible presets which were programmed by the user. Once the user selects a preset, the mode indication on the display 154 reflects the selected preset channel and the rest of the display 114 changes to reflect the information associated with the selected preset channel, as shown in FIG. 18B. In this example, the user selected preset A-4, which the user preprogrammed to be associated with channel number 81. The remainder of the information displayed on display 14 is changed to reflect the category, channel name, artist name and song name currently playing. Thus, in this example the category is "dance" the channel name is "BPM", the artist name is "4 Clubbers" and the song name is "Children 2002." The preset button can be programmed to be associated with a particular channel number by tuning to the desired channel and then pressing the desired preset number key for a predetermined amount of time, such as three seconds for instance. The unit will then indicate that the channel has been programmed to preset key with a brief pause in audio output, or other indication.

Some functionality in the receiver 100 changes depending on which docking station 124 receiver 100 is connected to. The following two examples illustrate this variable functionality. First, the receiver 100 has a menu, which the user can access to change configuration settings by pressing the menu key 146. When the menu key 146 is pressed, the display 114 changes to display a list of available menu items, as shown in the screen shot of FIG. 19A. The list of menu items can be selected using the scroll wheel 134 and the selection button 136 (or of course the scroll buttons 174, 176 and selection button 178 on remote control 132). The receiver 100 is adapted to sense the type docking station 124 to which it is connected. Thus, for example, the receiver 100 is able to determine if it is connected to a "home kit" docking station, a "car kit" docking station or a "boombox" docking station.

Figure 19A:
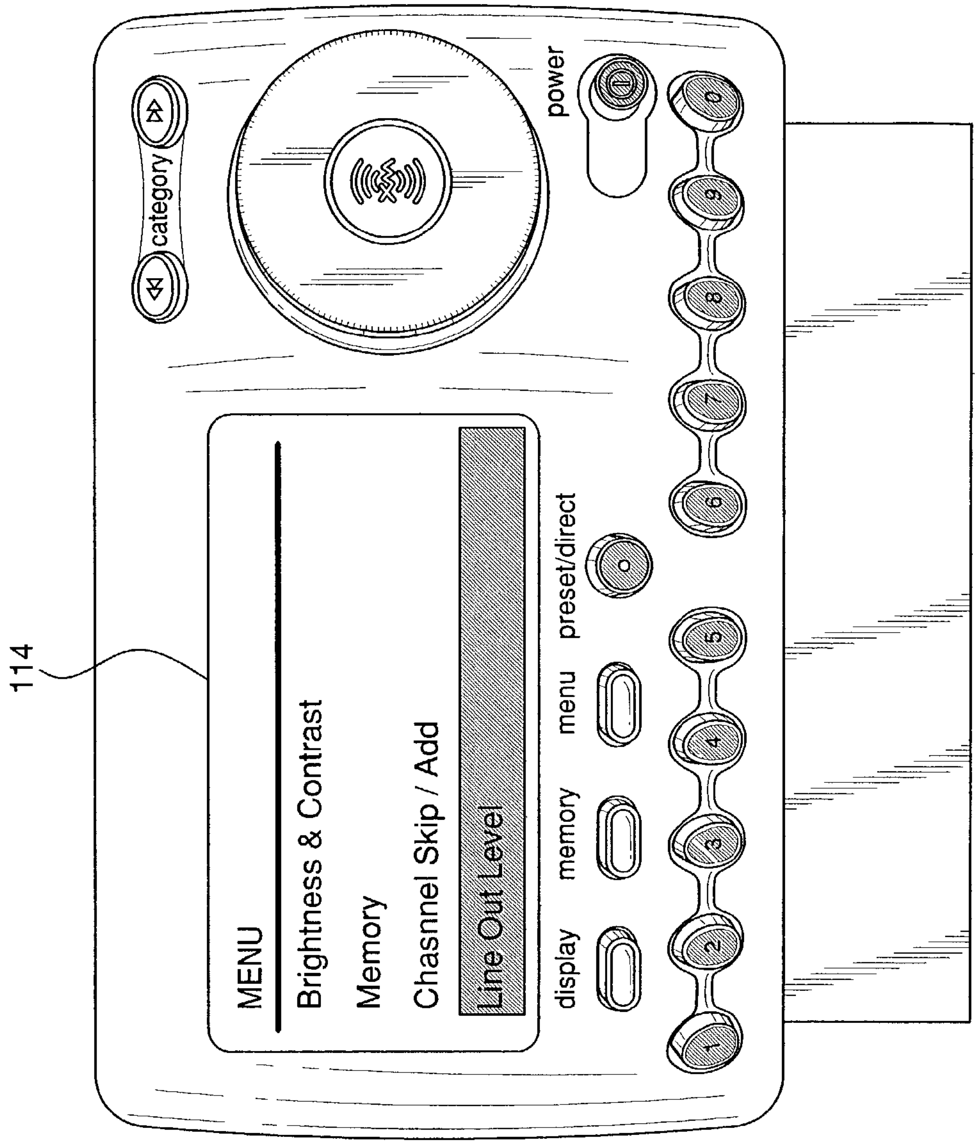
FIG. 19*a* demonstrates a screenshot of a display generated to illustrate a menu provided for changing receiver settings according to a system or method of the present invention.
Figure 19B:
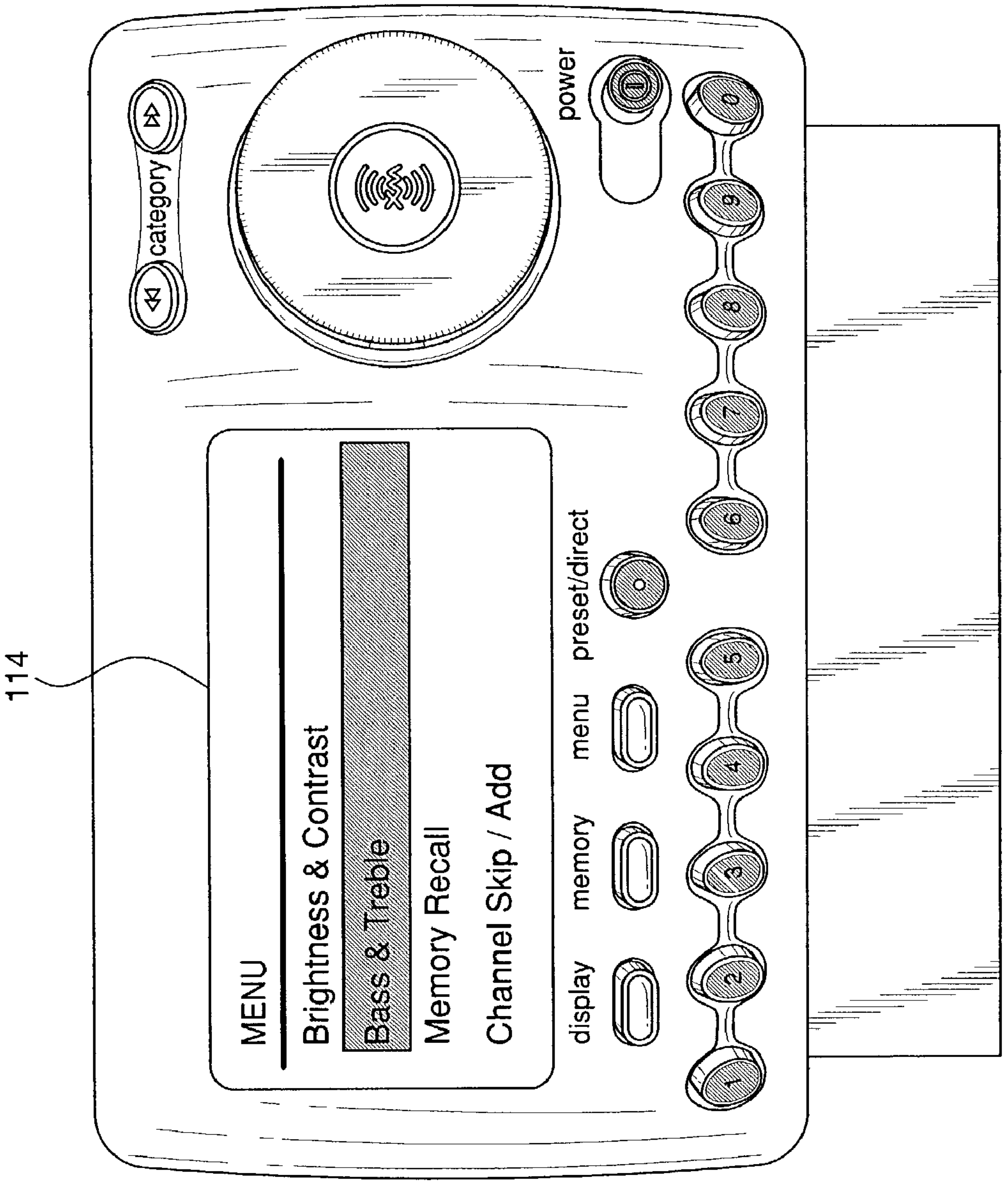
FIG. 19*b* demonstrates a screenshot of a display generated to illustrate a menu provided for changing receiver settings when the receiver is connected to a different docking station type than illustrated in FIG. 19*a* according to a system or method of the present invention.

Accordingly, certain functionality is adapted to be more suitable to the particular docking station to which the receiver 100 is connected. For instance, when the receiver 100 is connected to a "home kit" or "car kit" docking station, it is advantageous to be able to adjust the lineout level of audio. Thus, a line out level menu option is available as shown in FIG. 19A. However, when the unit is connected to a "boombox" docking station which is specifically designed for a particular lineout level, the receiver 100 sets the lineout level to a required value, and removes the lineout level menu option from the menu. Similarly, a base/treble adjustment option is available as a menu item when receiver 100 is connected to a "boombox" docking station, but not when connected to the "home kit" or "car kit" docking station, as shown in FIG. 19B, in which case the receiver 100 sets the bass and treble adjustments to a nominal level so that bass and treble can be controlled by the stereos to which the home and car kits are connected.

Function keys 190 and 192 on remote control 132 also change their functionality based on the docking station to which the receiver 100 is connected. For example, when receiver 100 is connected to the "boombox" docking station 124, the plus button 190 access a volume-up button and the minus button 192 functions a volume-down button. However, when the receiver 100 is connected to "home kit" or "car kit" docking station, because most home and car stereos already include volume controls, volume functionality in the remote control 132 would be redundant. Therefore, the plus key 190 is reassigned to the channel up function, and the minus key 192 is reassigned to the channel down function.

Receiver 100 also preferably stores line-out, bass, treble and volume settings for the various types of docking stations. In this manner the preferred settings for a particular type of docking station can be retrieved with the receiver 100 is subsequently connected to that type of receiver. For example, the line-out level can be adjusted to an optimum level for the boombox when plugged into the boombox docking station. If the receiver 100 is then connected to the car docking station, the line-out level control will become available in the menu, and the setting will automatically be reset to the level it was set when last connected to the car docking station. The volume, bass and treble settings are also stored and recalled the next time the receiver 100 is connected to the boombox docking station.

While the invention herein disclosed has been described by means of specific embodiments and applications thereof, numerous modifications and variations can be made thereto by those skilled in the art without departing from the scope of the invention as set forth in the claims.

What is claimed is:

1. A radio receiver for receiving a digital broadcast signal comprising:

a receiver unit configured to receive said digital broadcast signal comprising a plurality of channels of audio content and ancillary data related to said plurality of channels, said ancillary data comprising at least a first information element and a second information element;

said receiver unit comprising a processing device, a memory device and a user interface device adapted to allow a user to select from among said plurality of channels;

said user interface comprising a display adapted to operate in a first mode in which said display is arranged into at least two lines, said at least two lines comprising a first line for displaying said first information element in a small font, and a second line for displaying said second information element in a small font;

said display being further adapted to operate in a second mode in which said display is arranged to display said first information element and said second information element in a large font.

2. The radio receiver of claim 1, further comprising a user input operable to cause said display to toggle between said first mode and said second mode.

3. The radio receiver of claim 1, wherein said small font is less than one-half inch in height, and said large font is greater than one-half inch in height.

4. The radio receiver of claim 3, wherein said large font is greater than 1 inch in height.

5. The radio receiver of claim 1, wherein said receiver is adapted to scroll said first information element and said second information element across said display in said second mode.

6. The radio receiver of claim 1, wherein said ancillary data is contemporaneous information descriptive of said audio content.

7. The radio receiver of claim 6, wherein said first information element comprises an artist name and said second information element comprises a song name.

* * * * *